July 31, 1945.  J. DE LA CIERVA  2,380,580
ROTOR-EQUIPPED AIRCRAFT
Filed Dec. 6, 1932  17 Sheets-Sheet 1

INVENTOR
Juan de la Cierva
BY
ATTORNEYS

July 31, 1945.  J. DE LA CIERVA  2,380,580
ROTOR-EQUIPPED AIRCRAFT
Filed Dec. 6, 1932  17 Sheets-Sheet 2

INVENTOR
Juan de la Cierva
BY
ATTORNEYS

July 31, 1945.　　　J. DE LA CIERVA　　　2,380,580
ROTOR-EQUIPPED AIRCRAFT
Filed Dec. 6, 1932　　　17 Sheets-Sheet 5

INVENTOR
Juan de la Cierva
BY
ATTORNEYS

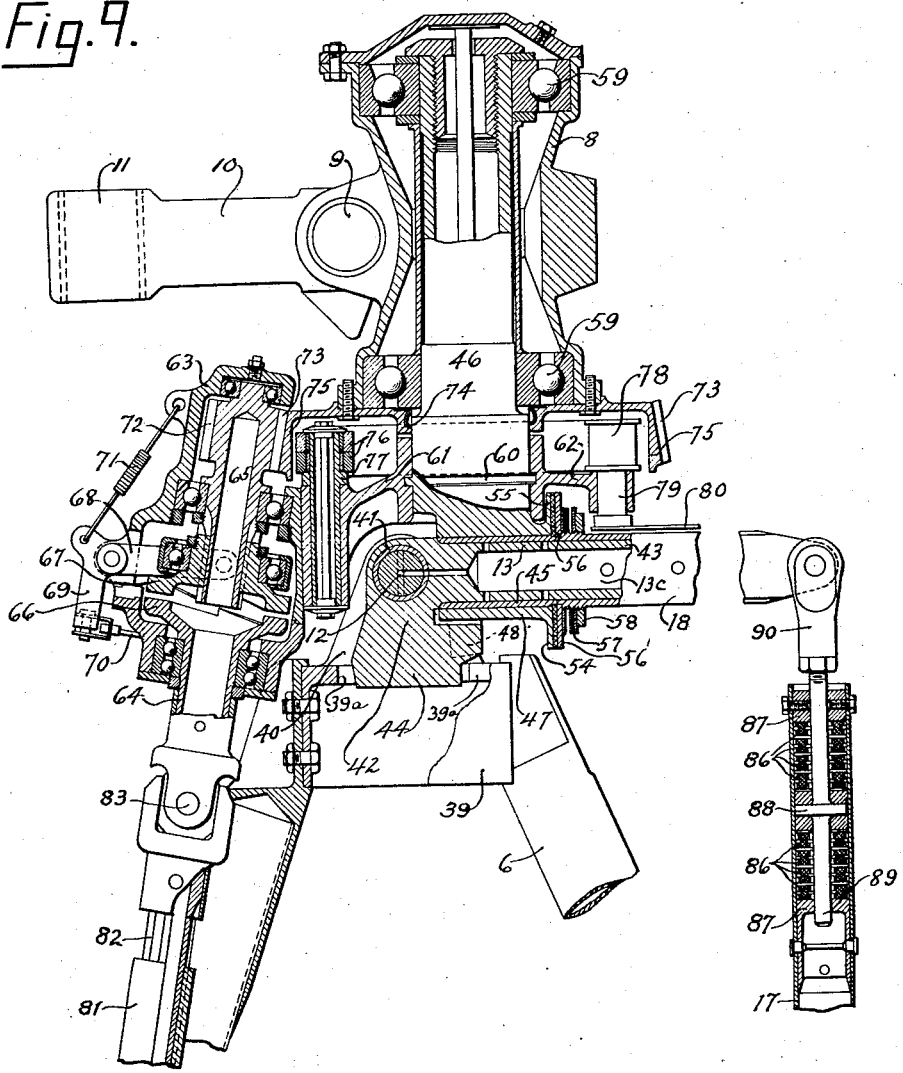

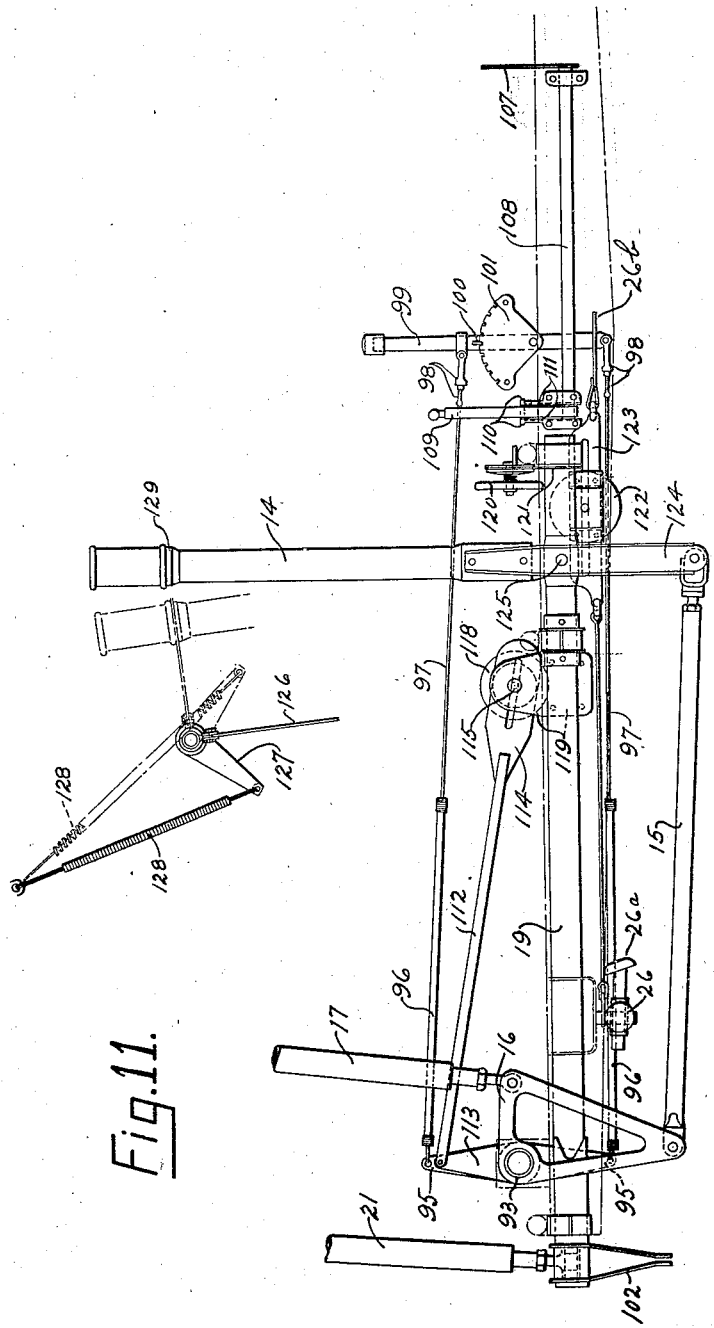

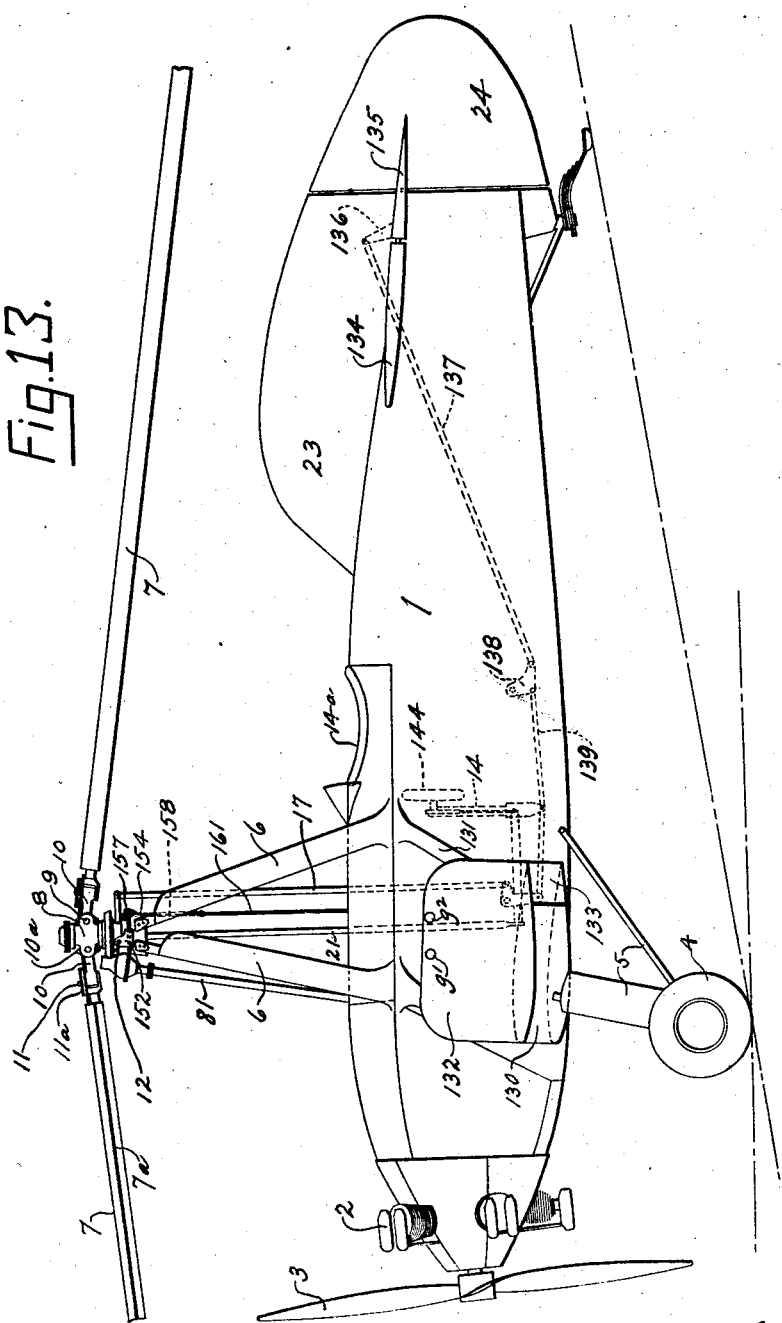

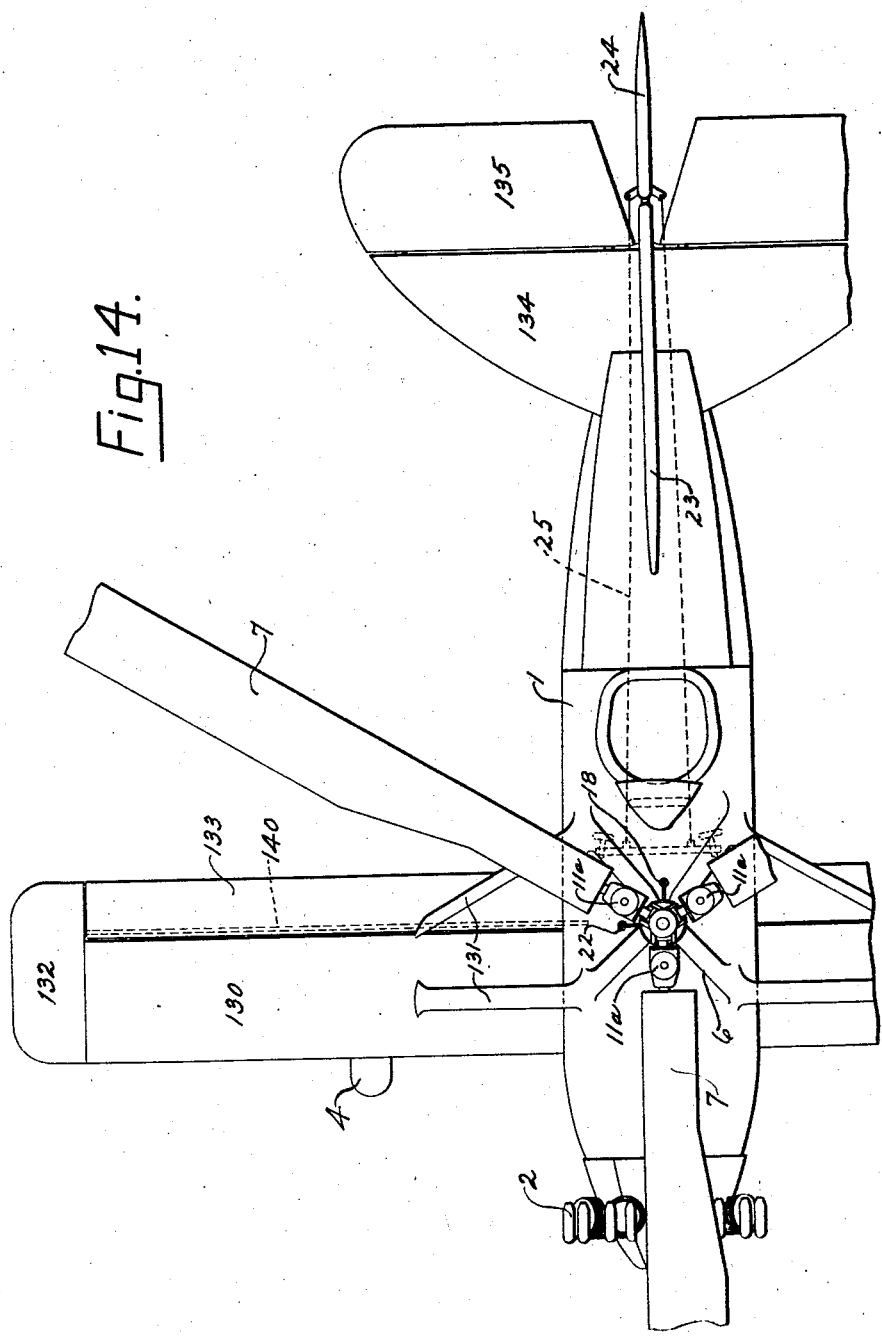

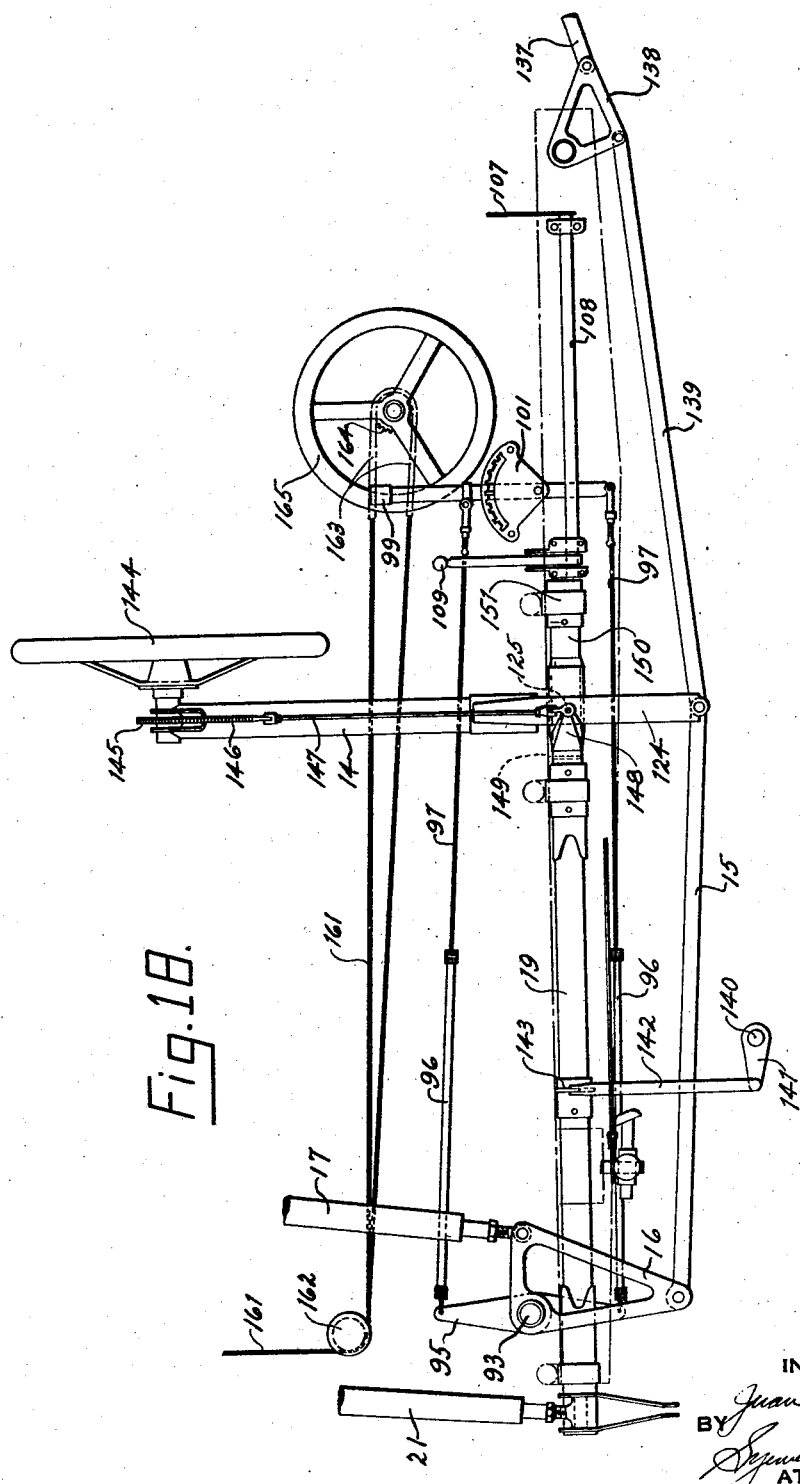

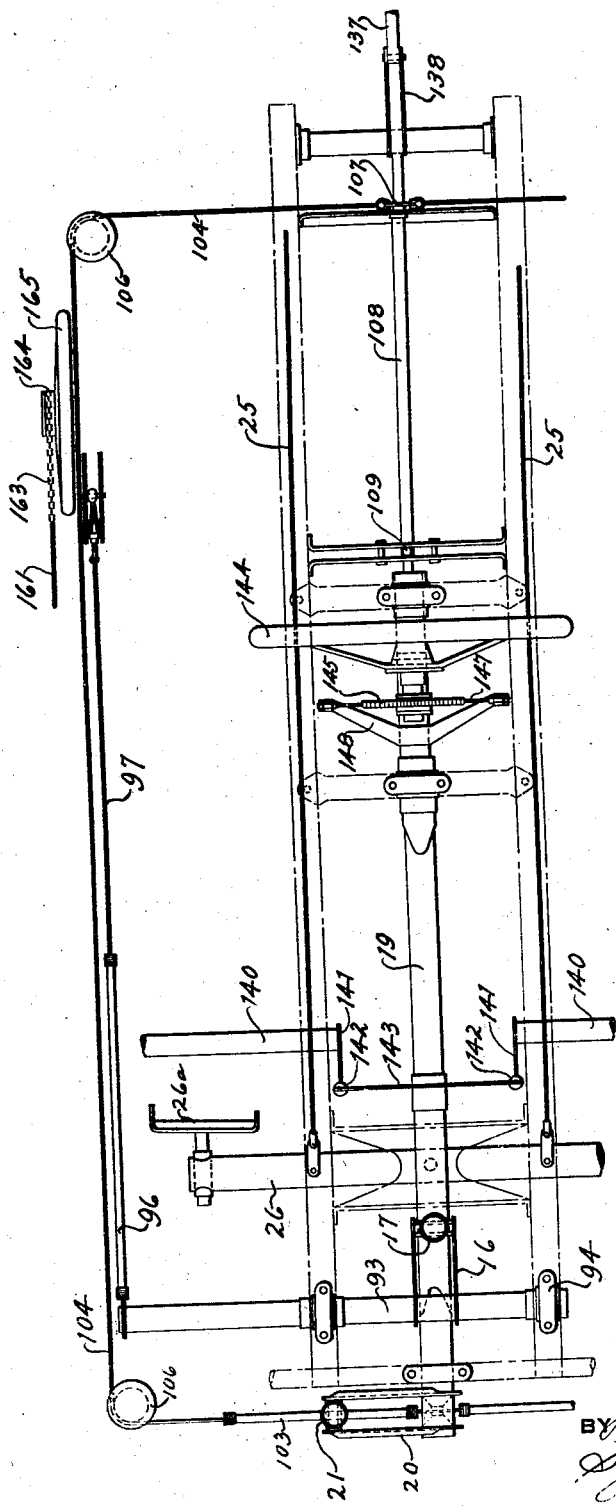

July 31, 1945. J. DE LA CIERVA 2,380,580
ROTOR-EQUIPPED AIRCRAFT
Filed Dec. 6, 1932 17 Sheets-Sheet 15
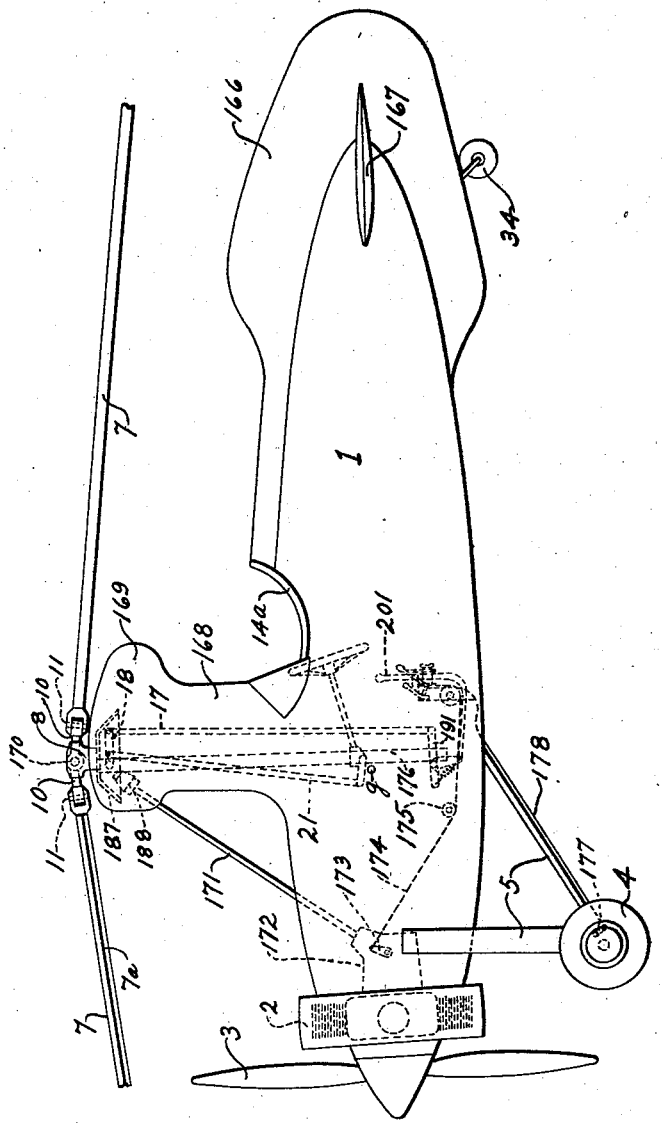

July 31, 1945. J. DE LA CIERVA 2,380,580
ROTOR-EQUIPPED AIRCRAFT
Filed Dec. 6, 1932 17 Sheets-Sheet 17

INVENTOR
Juan de la Cierva
BY
ATTORNEYS

Patented July 31, 1945

2,380,580

UNITED STATES PATENT OFFICE 2,380,580

ROTOR-EQUIPPED AIRCRAFT

Juan de la Cierva, Madrid, Spain, assignor, by mesne assignments, to Autogiro Company of America, a corporation of Delaware Application December 6, 1932, Serial No. 645,985
In Great Britain December 16, 1931

71 Claims. (Cl. 244—18)

General field of the invention

The present invention relates to rotor-equipped aircraft, being especially applicable to the type in which the principal means of support in flight comprises a sustaining rotor consisting essentially of a hub member mounted for rotation about a substantially vertical axis and a plurality of sustaining blades secured to said hub member, said rotor being capable of continuous rotation under the sole action of the relative wind in flight and of affording effective sustentation to the craft by reason of said continuous rotation, notwithstanding that means may be provided for applying auxiliary power to drive the rotor either for the purpose of imparting initial rotation to the rotor prior to "taking off" or for supplementing in certain conditions of flight the action of the aerodynamic forces in maintaining the rotation of the rotor.

Furthermore, aerodynamically-rotative-winged aircraft, to which the present invention is applicable, embody a sustaining rotor so constructed and operating that the resultant aerodynamic reaction thereon exerts, in normal flight, little or no overturning or tipping moments, about the center of the rotor disc or path of travel, especially in the direction of roll, i. e., in a plane containing the rotor axis and transverse to the flight direction; and such construction and operation is also such that gyroscopic precessional effects are substantially eliminated, controlled or obviated.

The foregoing is the general field to which the present invention is peculiarly adapted, and it is especially advantageous in aircraft of the said general type where the particular construction of the rotor includes mounting of the blades or wings movably or flexibly on the hub or rotational axis member, as by mechanism which may include a pivot axis or axes extending generally transverse to the common rotational axis of the wings or blades and preferably also transverse to the long dimension of the wings or blades themselves. Such pivot axes may be constituted by real pivots or by flexible connections equivalent to virtual pivots. While preferred arrangements involve the pivot axis or axes of the wings or blades as being generally horizontal, that is transverse the common rotational axis, and preferably transverse the longitudinal axes of the blades; yet the present invention is applicable to rotor constructions of a variety of pivot arrangements, a few examples of which are: rotors employing blade pivot axes having more or less inclination or angularity with respect to a plane perpendicular to the common rotational axis and/or with respect to the longitudinal axes of the wings or blades (an example of which is shown in my Patent No. 1,811,303); rotors in which a plurality of blades, for example two opposite blades, are mounted on a common spar for rocking or oscillating as a unit about an axis generally intersecting the common axis of rotation (an example of which is shown in my Patent No. 1,682,893); or the mounting means for the individual blades of the rotor may include substantially vertical pivot axes permitting the blades to perform independent swinging movements in the general plane of rotation (an example of which is shown in my Patent No. 1,859,584).

In general, therefore, it will be seen that the present invention is applicable in machines having autorotative or aerodynamically actuated rotors of practically any specific type, provided that some arrangement is employed to obtain variation in aerodynamic angle of attack of the blades of the rotor; provided further that the effects of gyroscopic action be accommodated, compensated for, or otherwise eliminated; and provided further that during flight of the machine involving autorotational action of the wings, they be set or be capable of being disposed at such actual incidences on their common rotational axis that autorotation by the relative air-flow in flight will at such time be assured.

General objects of the invention

The general object of the present invention is the provision of improved means of supporting, stabilizing, and controlling, aircraft of the above-mentioned types.

More particularly, the present invention contemplates attainment of the foregoing object by the utilization of a rotor having aerodynamically actuable, i. e. autorotatable, wings as the chief, or even the sole, means of sustention and control of the aircraft in all of its normal flight maneuvers; which is of especial advantage because of the fact that full control in every direction may thus be obtained regardless of the direction and speed of movement of the aircraft as a whole relative to the air, since the power and effectiveness of the rotor for these purposes is always present as long as the rotor is turning at a speed within its autorotational range.

More specifically, the invention contemplates the obtaining of improved stabilizing and controlling of the aircraft by controllably varying the path or action of the rotary wings, for example, by varying either the inclination or the position, or both, of the rotor axis with respect to the aircraft body and/or its center of gravity, both laterally and longitudinally; the invention in this respect being proven, by actual flight, to be a very advantageous and substantial advance in this art over the arrangement of my prior Patent No. 1,678,935.

Still more specifically, the present invention contemplates a machine having a single aerodynamically actuated rotor made up of a system of wings rotating about an upright axis passing close to the center of gravity of the machine, which cooperates with the weight of the machine and the disposition of the surface area thereof in such a way as to obtain an extremely powerful control both in pitch and in roll; and by utilizing certain other features of the present invention hereinafter to be described, adequate control in yaw may also be obtained, whereby the use of a separate controllable rudder may be dispensed with, if desired.

By means of the features embodied in the present invention an aircraft of the type referred to may be endowed with such inherent stability in pitch and roll by utilizing the stabilizing characteristics of the rotor itself that the use of non-rotative lateral wings for stability in roll may even be dispensed with altogether and the usual horizontal tail surface for stabilizing the craft in pitch may be made considerably smaller than has hitherto been possible, if not entirely eliminated. At the same time the powerful control in pitch and roll provided by the controlled movements of the rotor lift line as by shifting its axis make it possible for conventional ailerons and elevators, as usually provided for the purpose of lateral and longitudinal control, to be dispensed with, if desired.

In developing this invention, I have further found it to be desirable that stability should obtain whether the pilot's controls are locked or free. This requirement may be otherwise expressed by stating that in addition to stability of the whole aircraft, stability of the controls is desirable, for, when the same organ, in this case the rotor, is employed in both a sustaining and a controlling capacity, the requirement that the aircraft shall be stable with free controls includes the requirement that the control shall be stable, i. e., that the pilot's controls will tend to a neutral position if released.

The invention further contemplates such a construction of rotor and controls that when the controls are released the aircraft will trim at a steady forward speed, and without list to either side, laterally.

As before indicated, the invention further contemplates the use of the main sustaining rotor as an ever-present means for stabilizing the craft, in supplementation of or in lieu of ordinary adjustable stabilizing surfaces.

Several specific embodiments of the invention are hereinafter described, as being illustrative of a few of the variations in structure by which the invention may be practiced; but in general, the major accomplishments of the present invention are attained by the construction and operation of the rotor as a whole, including its mounting means and certain control mechanisms associated therewith for control of the craft both laterally and longitudinally.

A considerable number of the objects, advantages, and structural features of the invention will be more fully brought out, after a brief description of the drawings, but a few of the major structural features should here be touched upon, as follows: in accordance with the invention, the rotor blades or wings are not only mounted for aerodynamic rotation and for pivotal movements to accommodate and/or compensate for differential lift arising from high speed forward flight, gyroscopic force set up by rotation, etc., but control mechanism is associated with the wings so as to utilize them for the stabilizing and controlling of the craft as well as for the sustention thereof. Although the controlling mechanism may be associated with the wings themselves to act thereon, it is preferable to employ, and I have herein illustrated, constructions in which the controlling mechanism utilizes the entire rotor as a unit for effecting the stabilizing and controlling action.

Broadly, this stabilizing and controlling action is effected by controlling the effect of the lift line of the rotor, as by causing a shifting of the lift line thereof. Specifically, the invention contemplates mounting the common rotational axis of the rotor for tilting and/or bodily displacement longitudinally and laterally of the craft.

Still more specifically, the invention contemplates mounting the hub or rotational axis of the rotor on a pair of transverse pivots, one of which extends generally longitudinally of the craft and the other of which extends generally transversely of the craft. The preferred arrangement further involves the dual articulation of each wing of the rotor to its hub or axis by means of individual horizontal and vertical pivots.

The invention further involves mechanical means for imparting a torque to the rotor, while at the same time providing means for the rotor to overrun the mechanical drive, under the influence of the aerodynamic forces in flight; and in accordance with this invention the drive mechanism is further arranged in such manner that it will not interfere either with the pivotal movements of the wings or with the pivotal movements of the rotor hub as a whole for control and stabilizing purposes. In association with such mechanism, the invention further contemplates a rotor brake, which, with its control, is so associated with the rotor axis that it does not interfere with the movements of said axis for control purposes.

The invention further contemplates the mounting of the tiltable rotor axis on a traveling carriage, in such manner that trim for variable loading may be effected and that adequate control of the craft by the rotor alone may be accomplished without such excessive degrees of tilting thereof as would cause interference between the rotary wings and other parts of the craft such as the propeller; and by means of such stabilization and controlling the invention contemplates the elimination of supplemental fixed wings, ailerons, and other surfaces, whereby the efficiency of the machine as a whole is very greatly increased in certain of the embodiments shown.

While other mounting or pivot arrangements of the wings may make desirable other arrangements of the control mechanism and control pivots of the rotor axis, since various wing pivot arrangements result in various positions of the rotor lift line; the present preferred blade pivot arrangement, namely the independent dual articulation of each blade to its central axis, involves a positioning of the average lift line of the rotor which is off-center, both longitudinally and laterally, from the center of rotation of the rotor hub, and the present invention for this and other reasons contemplates the location of the tilting or control axes offset from the center of the rotational axis; the rotor hub pivot for longitudinal tilting of and control by the rotor being located in advance of the center of the hub, and the rotor hub pivot for lateral tilting of and control by the rotor being located laterally of the center of the hub toward that side on which the blades in their rotation are moving rearwardly.

The foregoing, and other objects, advantages, and structural features, will be more clearly understood after a brief description of the figures of the drawings, which will first be followed by a discussion of some of the fundamental principles of the invention and second by a description of structure and operation of the invention.

Description of the drawings

Figure 9 is a vertical section (taken longitudinally of the craft) through the rotor head assembly of the aircraft of Figures 6 to 8;

Figure 11 is an enlarged side elevational view of the arrangement of the controls for the aircraft, in or associated with the pilot's cockpit;

Figure 13 illustrates in side elevation a modified aircraft embodying the invention;

Figure 14 is a partial plan view of the aircraft of Figure 13;

Figure 16 is a view somewhat similar to Figure 9, being a vertical longitudinal section through the rotor head assembly of the aircraft shown in Figures 13 to 15 inclusive;

Figure 18 is an enlarged side elevational view of the controls for the aircraft of Figures 13 to 17;

Figure 19 is a plan view of the controls shown in Figure 18;

Figure 20 is a side elevational view of a third structural embodiment of the present invention;

Figure 24a is a view similar to Figure 24 but illustrating the form of rotor hub shown in Figure 24 in association with the type of rotor drive mechanism of the structural embodiment of Figures 20 to 23 inclusive.

Theoretical exposition of the invention

For a full and proper understanding of the invention, reference should first be had to the diagrammatic figures, numbered 1 to 5. These are illustrative of certain principles of the invention under autorotative conditions in a machine wherein the rotor is adapted for autorotation.

In these figures, the body of the aircraft is generally indicated at $b$ and the rotational axis of the rotor is indicated by the line 0—0 which lies in the plane of the drawings. For convenience, the rotor is assumed to have an even number of blades or wings, and the lines $r$—$r$ indicate the longitudinal or "span" axes of a pair of diametrically opposed blades lying in the plane of the drawings. The rotor used in these diagrammatic illustrations is of the type in which the blades are pivotally mounted to the hub member, the pivotal mountings including horizontal pivots whose axes, which are substantially perpendicular to the plane of the drawings, are indicated at $a, a$ (Figures 1 and 4); at $a', a'$ (Figures 2 and 5); and at $a^2$ (Figure 3).

The position in space, of the resultant aerodynamic reaction on a rotor of this type in flight, will in general vary with the angle of incidence of the rotor as a whole to the flight wind, the angle of incidence of the rotor being defined as the angle of incidence of a plane perpendicular to the rotational axis.

Figure 1:
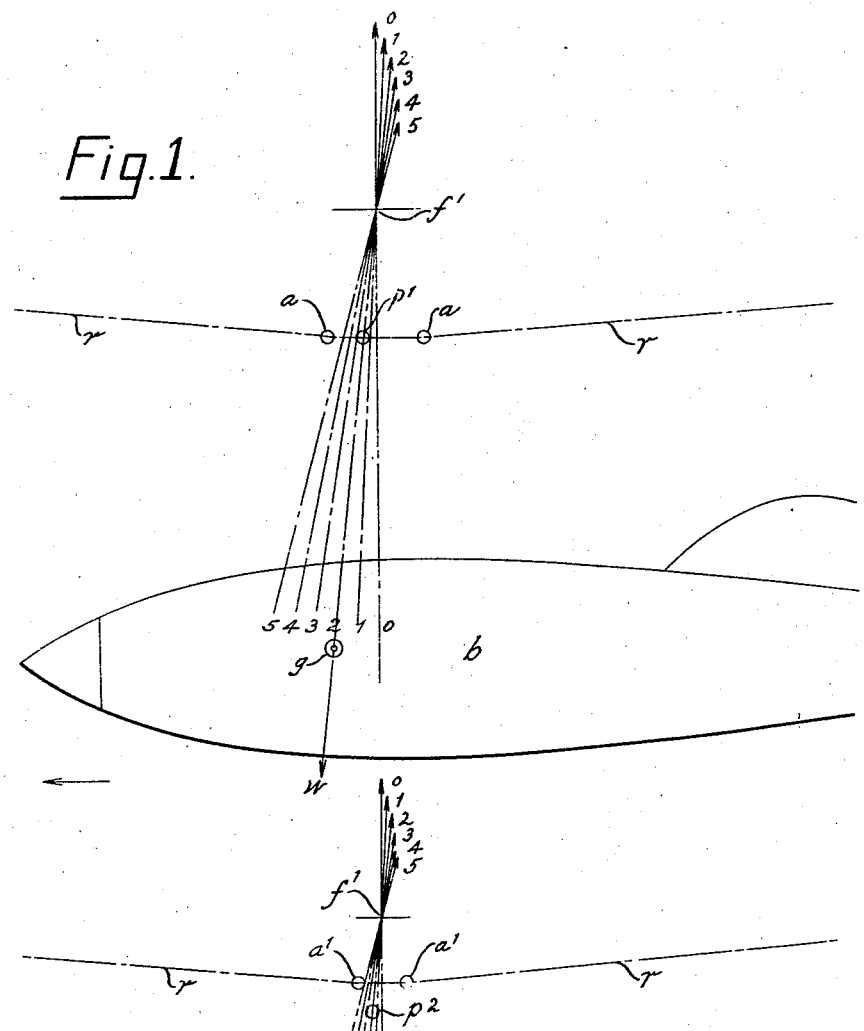
Figure 1 is a purely diagrammatic side elevation of part of an aircraft body with an autorotatable sustaining rotor, the rotor being of a type in which the blades are individually pivoted on pivot axes offset from the center of rotation.
Figure 2:
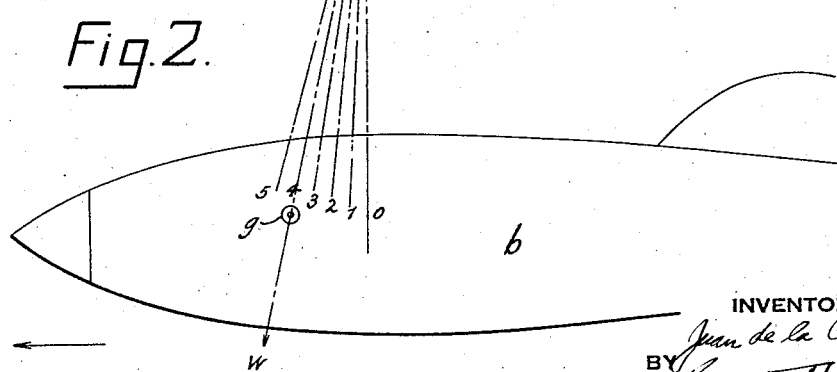
Figure 2 is a diagram similar to Figure 1, but illustrating certain characteristics of a machine in which the individual pivots of the rotor blades are closer to the center of rotation.
Figure 3:
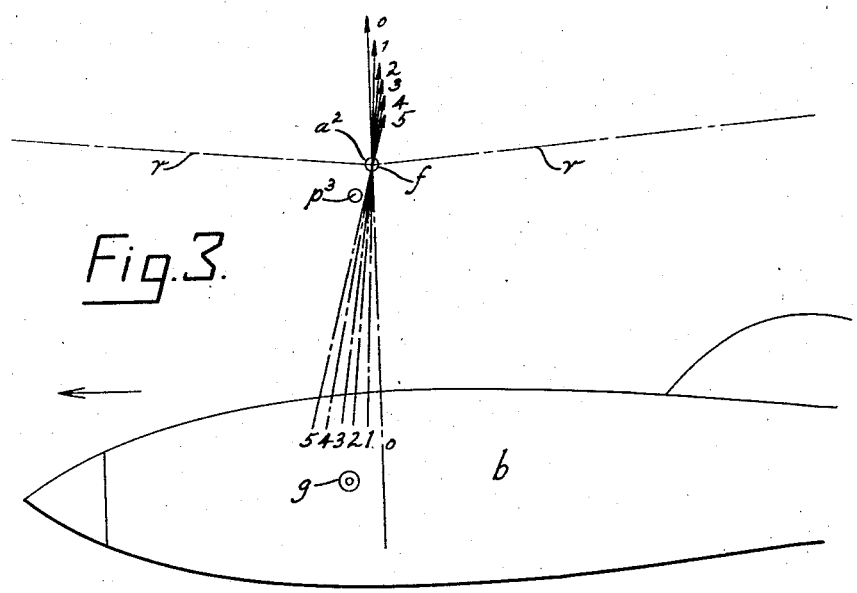
Figure 3 is a view similar to Figures 1 and 2, but of a machine in which the pivot axis or axes for the mounting of the rotor blades on their hub intersects the axis of the hub.
Figure 4:
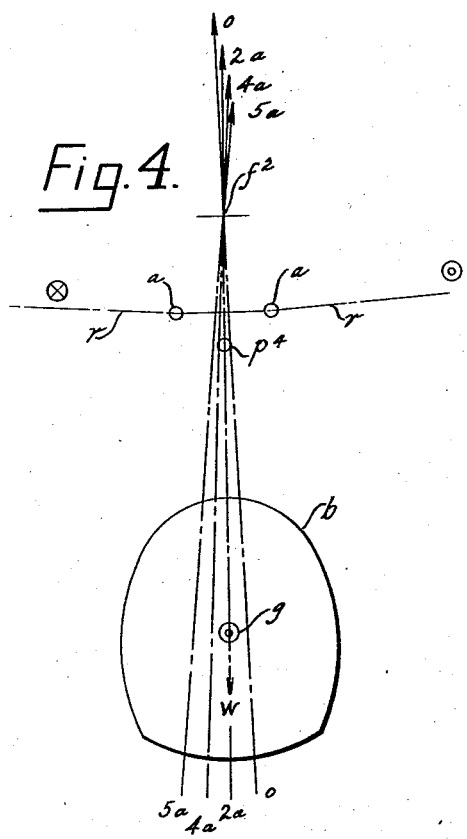
Figure 4 is a diagrammatic front elevation of the machine of Figure 1.
Figure 5:
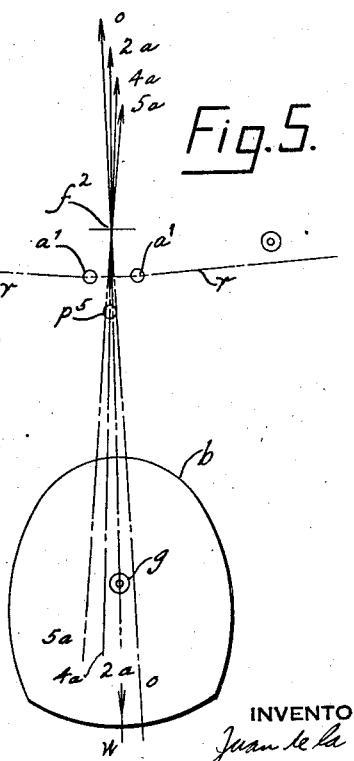
Figure 5 is a diagrammatic front elevation of the machine of Figure 2.
Figure 6:
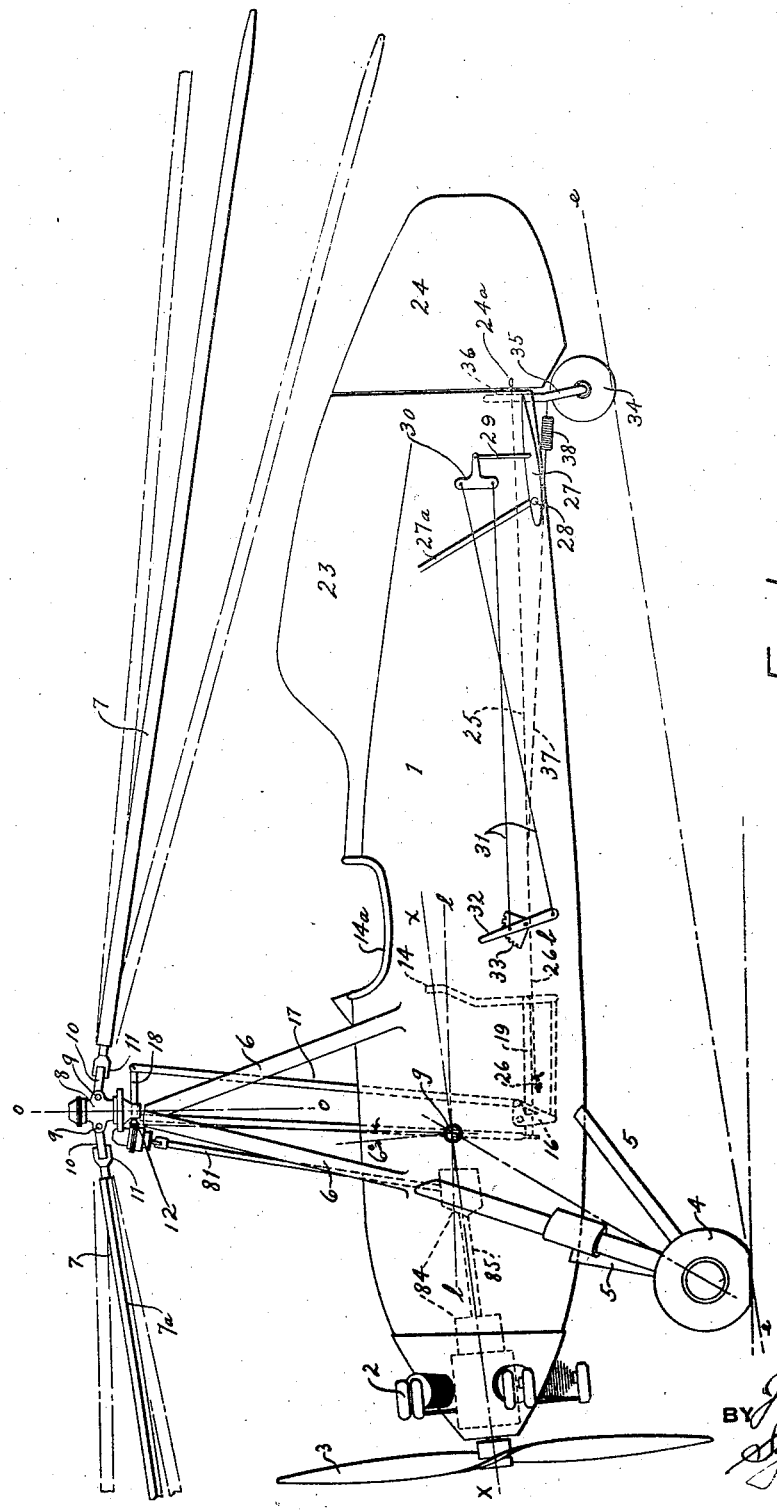
Figure 6 is a side elevation of an aircraft embodying one form of the present invention.

In Figures 1, 2 and 3 are shown a number of lines designated 0—0, 1—1, 2—2, 3—3, 4—4 and 5—5; and in Figures 4 and 5 are shown a number of lines designated 0—0, 2a—2a, 4a—4a and 5a—5a. These lines represent the projections, on the plane of the drawings, of the lines of resultant aerodynamic reaction for different angles of incidence of the rotor, the line 0—0 which is coincident with the rotational axis being that associated with an angle of incidence of 90° which corresponds to a vertical descent of the aircraft, the rotor axis being vertical. The remaining lines, from 0—0 up to 5—5 (in Figures 1, 2 and 3) and from 0—0 up to 5a—5a (in Figures 4 and 5) are associated with progressively decreasing angles of incidence of the rotor, within the flying range, the line 5—5 (in the side views of Figures 1 and 2) and the line 5a—5a (in the front views of Figures 4 and 5), for example, being associated with a small angle of incidence of the rotor, corresponding to the maximum flight speed.

It has been found as a result of theoretical researches, which have been confirmed by construction and flight tests, that the projections, such as 0—0, 1—1, 2—2 etc., of the resultant aerodynamic reaction on a plane containing the rotational axis 0—0 (considering the plane which is longitudinal of the aircraft, as in Figures 1 to 3) and the projections 0—0 up to $5a$—$5a$ (considering the plane transverse thereto, as in Figures 4 and 5), intersect the rotational axis 0—0 substantially at a common point which is indicated in Figures 1 and 2 at $f^1$ and in Figures 4 and 5 at $f^2$, and is indicated at $f$ in Figures 3. This point will be designated the "focal point."

The focal point for reaction projections on a longitudinal plane containing the rotational axis (as in Figures 1 to 3) is not necessarily coincident with the focal point for reaction projections on a transverse plane (as in Figures 4 and 5). These points will therefore be designated respectively the "longitudinal focal point" ($f^1$ in Figures 1 and 2) and the "lateral focal point" ($f^2$ in Figures 4 and 5).

Referring to Figures 1, 2 and 3; the direction of flight is indicated by an arrow and it will be seen that as the angle of incidence of the rotor decreases (as with increase in forward flight speed) the part of the line of resultant aerodynamic reaction which lies below the longitudinal focal point moves progressively further forward.

Figure 7:
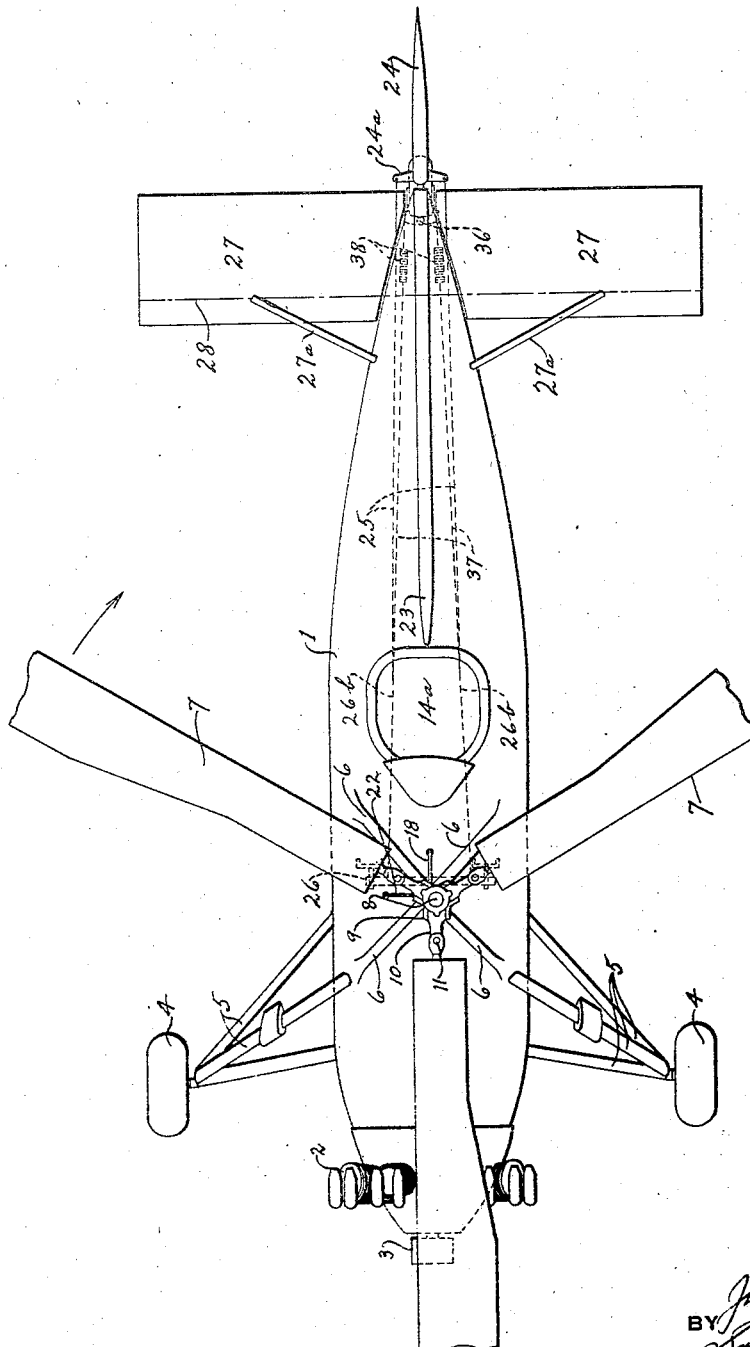
Figure 7 is a plan view of the aircraft of Figure 6.
Figure 8:
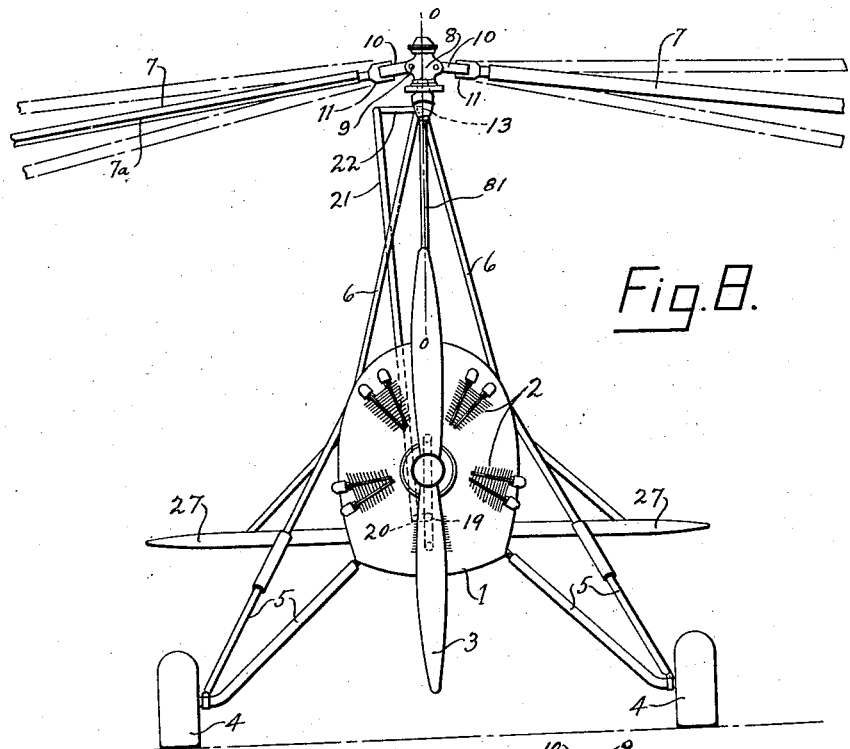
Figure 8 is a front elevational view of the aircraft of Figures 6 and 7.
Figure 15:
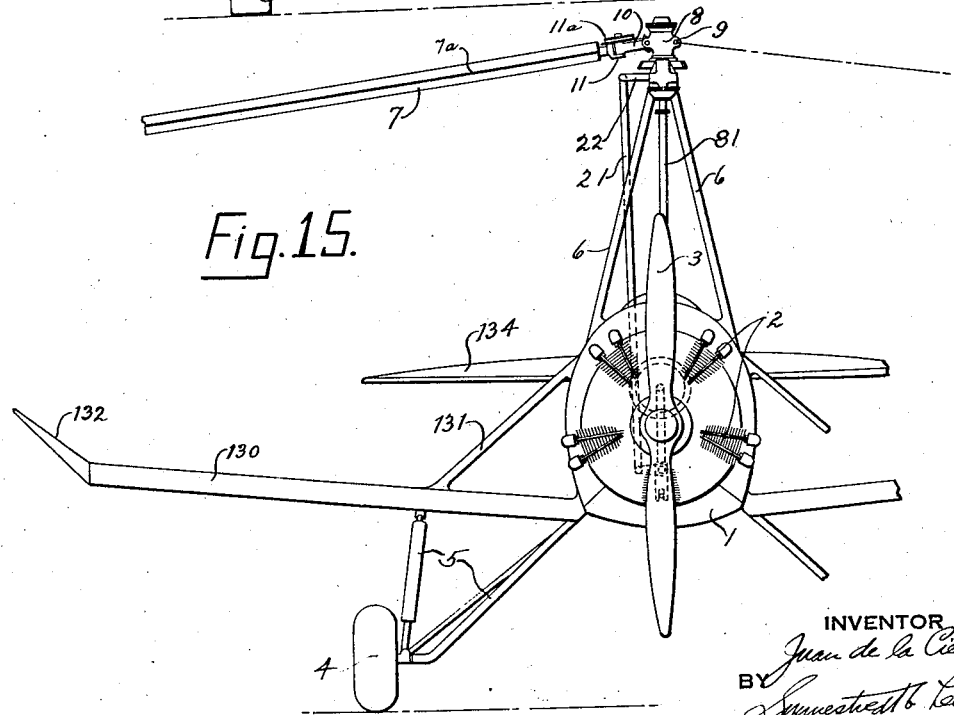
Figure 15 is a partial front elevation of the aircraft of Figures 13 and 14.

Referring to Figures 4 and 5; the advancing and retreating rotor blades are indicated in the conventional manner (direction of rotation being the same as in the structure of Figure 7) and it will be seen that as the angle of incidence of the rotor decreases, the part of the line of resultant aerodynamic reaction lying below the focal point $f^2$ moves progressively further towards the retreating blade.

The foregoing statement represents in simplified terms a typical case of the relation between the rotor angle of incidence and the position of the aerodynamic reaction line, when the rotor is being autorotatably actuated. In general the reaction line tends to be displaced further towards the retreating blade as the angle of the incidence decreases, though not always in a very regular manner, the relation depending on the rotor characteristics.

It should now be stated that the position of the focal point on the rotational axis is determined by the distance of the horizontal articulation pivot axes from the rotational axis. Thus, the greater the distance separating the horizontal articulation pivot axes from the rotational axis the greater will be the distance by which the focal point lies above the plane containing the horizontal articulation pivot axes. Illustration of this is found in Figures 1 to 5.

In Figure 1 the horizontal blade articulation axes $a$, $a$ are spaced fairly far from the rotational axis 0—0 and the focal point $f^1$ lies at a considerable height above the plane containing points $a$, $a$. In Figure 2 the articulations $a'$, $a'$ are closer to the rotational axis and the focal point $f^1$ lies closer to the plane of the articulations. Figure 4 illustrates a condition similar to Figure 1 in the transverse plane and Figure 5 a condition similar to Figure 2; $f^2$ in each of these figures illustrating the transverse focal point.

Figure 3 illustrates the case in which the horizontal axes of the blade articulation pivot means are coincident with the rotational axes. In this case the focal point $f$ coincides with the intersection of the rotational axis and the blade articulation axes.

Some of the primary features and objects of the present invention may be obtained by a pivotal mounting of the whole rotor, whereby the inclination of the rotor may be varied in a plurality of planes for control purposes. In Figures 1 to 5 the reference letter $p$ (modified with numbers, as hereinafter referred to) indicates generally the point in which the axis of such a pivotal mounting of the rotor cuts the plane of the drawings, and this axis is in each case so directed that the plane of the drawings (which contains the rotational axis 0—0 of the rotor) contains also the shortest distance between said rotational axis and said pivotal axis. In other words the pivotal axis $p$ lies in a plane which is perpendicular to the plane of the drawings and parallel to the rotational axis 0—0.

For purposes that will hereinafter appear the "pivot points" ($p$) are distinguished in the various figures by affixes as $p^1$, $p^2$, etc., the general reference $p$ applying to all such points.

The pivotal axis ($p^1$, $p^2$, $p^3$) appearing in Figures 1 to 3 is the rotor control axis which is transverse to the aircraft, enabling the rotor to be tilted in a longitudinal plane, for controlling the aircraft in pitch. The pivotal axis ($p^4$, $p^5$) which appears in Figures 4 and 5 is the rotor control axis which extends longitudinally of the aircraft, enabling the rotor to be tilted laterally, for controlling the aircraft in roll.

It will be seen that, in these drawings, in every case the pivotal axis $p$ is in general located below the focal point and is offset from the rotational axis in the direction of the aerodynamic line, such as 1—1, 2—2, $2a$—$a$, $4a$—$4a$, etc. The effect of this manner of locating the pivotal axes will now be discussed.

In the first place it must be clearly understood that the position of the line of resultant aerodynamic reaction with respect to the rotational axis of the rotor depends (in the construction shown) solely on the angle of incidence of the latter to the flight wind at any given moment, and is not affected by the relative attitudes of the rotor axis and the aircraft body.

Referring to Figure 1, it will be seen that the pivot axis, indicated at $p^1$, for longitudinal rotor tilting lies on the line 2—2, and thus it follows that the rotor as a whole will be in equilibrium about its pivot axis $p^1$ when the angle of incidence of the rotor is such that the line of resultant aerodynamic reaction passes through the pivot axis $p^1$, i. e., when its projection is represented by the line 2—2.

Now let it be supposed that the angle of incidence of the rotor is by chance increased so that the aerodynamic reaction now acts along a line whose projection is represented by the line 1—1. The rotor is no longer in equilibrium about its pivot $p^1$ but is subjected to a couple tending to rock the rotor about its pivot $p^1$ in a sense (anticlockwise with respect to Figure 1) which will bring about a decrease of the rotor's angle of incidence and restore it to the position of equilibrium in which the reaction passes through the pivot $p^1$. Similarly if the angle of incidence of the rotor is by chance decreased, a restoring couple acting in the opposite direction will be set up. Thus the equilibrium of the rotor about its pivot axis $p^1$ is stable. This implies that if the controls which effect the tilting of the rotor in a longitudinal plane about the pivot $p^1$ are released the rotor will set itself at an angle of incidence to the flight wind for which the projection of the aerodynamic reaction lies along the line 2—2 passing through the pivot $p^1$. This angle of incidence corresponds to a definite forward flight speed hereinafter called the "trimming speed" or "speed of trim."

The longitudinal stability of the aircraft as a whole, at the trimming speed, with free controls, is assured by the pendular suspension of the aircraft body below the pivot $p^1$. Thus in gliding flight the aircraft will assume an attitude in which the center of gravity $g$ lies on the line of resultant aerodynamic reaction of the rotor, it being assumed that the drag of the aircraft body acts approximately through the center of gravity. This equilibrium attitude is shown in Figure 1, the projection (on the plane of the drawings) of the center of gravity being indicated at $g$ which lies on the line 2—2; the arrow W, which also lies along the line 2—2, indicating the projection (on the plane of the drawings) of the resultant of the weight and drag of the aircraft body. The equilibrium is easily seen to be stable, being that of a simple pendulum with aerodynamic damping.

With the control for longitudinal tilting of the rotor locked the aircraft is equivalent to one having a fixed rotor axis. It is already known that such an aircraft possesses a reasonable degree of longitudinal stability, and it will trim in gliding flight at a speed for which the aerodynamic reaction line passes through the center of gravity. Any chance variation of the rotor angle of incidence will then introduce a restoring couple acting on the aircraft to return it to the attitude of trim.

Figure 2 illustrates the case when the control for longitudinal rotor tilting is locked in a position other than that corresponding to the trimming speed with free controls. This is shown by the fact that a line joining the projection $g$ of the center of gravity, on the plane of the drawings, with the pivot point $p^2$ does not pass through the focal point $f^1$. The aircraft will now trim at an angle of incidence for which the projection of the aerodynamic reaction lies along the line 4—4 passing through the point $g$, while the hinge moment about the point $p^2$ required for holding the rotor axis in this attitude is approximately W.$x$, where $x$ is the perpendicular distance of $p^2$ from the line 4—4.

Regarding the lateral equilibrium and stability of the aircraft, Figures 4 and 5 may be referred to. In Figure 4 is illustrated a condition of lateral equilibrium with the control for lateral tilting free, the aircraft being flown at a speed such that the projection of the aerodynamic reaction line on a transverse plane containing the rotor axis 0—0 lies along the line $2a$—$2a$ which passes through the axis $p^4$ for lateral rotor tilting. The angle of lateral tilt of the rotor will be such that the line $2a$—$2a$ also passes through the projection $g$ of the center of gravity, the aircraft assuming an attitude in which the line $2a$—$2a$ is vertical so that the weight of the aircraft acts along the line $2a$—$2a$ as indicated by the arrow W. The stability of the rotor about its pivot is vertical in the absence of side-slip, but any deviation from the position of equilibrium will initiate a side-slip of the aircraft, which will in turn exert a side force on the rotor, acting approximately in the plane of the blade articulation pivots $a$, tending to restore the rotor to the equilibrium position. The stability of the aircraft as a whole, as distinct from that of the rotor, may be considered in a sense to be assured by the pendular suspension of the body below the axis $p^4$ for lateral rotor tilting, but strictly the stability of the rotor and the body respectively, cannot be considered independently since the restoring effect is due to side-slip and this involves a lateral displacement of the body from the line of flight.

In Figure 5 is illustrated a condition in which the aircraft is flown at a speed other than that for perfect lateral trim with free controls.

In this case the pivot axis $p^5$ is offset from the line of aerodynamic reaction, whose projection is the line $2a$—$2a$ as before. There will now be an overturning moment on the rotor approximately equal to W.$y$ where $y$ is the perpendicular distance of the point $p^5$ from the line $2a$—$2a$. This moment may be resisted by an equal and opposite moment applied by the control for lateral rotor tilting, and the rotor will assume an angle of lateral tilt for which the line $2a$—$2a$ passes through the point $g$, the aircraft assuming an attitude for which the line $2a$—$2a$ is vertical.

If, on the other hand, no correcting moment is applied to the rotor by the control, the system will assume a configuration and attitude giving a degree of permanent side-slip sufficient to balance the overturning moment W.$y$ acting on the rotor.

Whether the control is locked or free, the system will assume a configuration and attitude of equilibrium which will be stable by virtue of the effect of side-slip, provided the pivot axis $p^4$ or $p^5$ for lateral rotor tilting does not lie far from the line of aerodynamic reaction.

It may be pointed out that whereas in order to simplify the problem the discussion of equilibrium and stability has been restricted to the case of gliding flight the arguments brought forward will apply generally. Even the addition of a separate propelling means introduces no essential modification of the system, provided that the thrust of the propelling means passes close to the center of gravity, in accordance with the disclosure of my copending application, Serial No. 432,773, filed March 3, 1930, which issued as Patent No. 1,948,514.

It may here be stated that although the foregoing theoretical exposition, having reference to Figures 1 to 5 of the drawings, has been made with respect to sustaining rotors whose blades are attached to the hub member by means including horizontal articulation pivots such as $a$—$a$, $a'$—$a'$ or $a^2$ (in the figures) the conclusions arrived at are believed to be generally valid for all rotors incorporating means or automatically compensating the transverse overturning moment normally experienced by a rigid-bladed rotor when its motion includes a forward translational component.

Some of the means or mechanisms for accomplishing the objects of this invention may involve a tilting or angular displacement of the virtual axis about which the rotor blades revolve, without actually displacing the structural axis, i. e., the axis of the rotor hub bearings; or still other means, acting on the rotor or its wings, to shift its lift line, may be employed; and it is to be understood that, in what here follows, the expression "rotational axis" includes a real or a virtual axis of rotation.

According to the preferred embodiments of the present invention, in an aircraft whose principal means of support in flight comprises an aerodynamically-actuable sustaining rotor having a substantially vertical rotational axis, means are provided for controllably tilting the said axis in relation to the body of the aircraft in a plurality of vertical planes about real or virtual pivot axes, said means being characterized in that each such pivot axis is located above the center of gravity of the aircraft, that the point of intersection of the rotational axis with the projection of the line of resultant aerodynamic reaction of the rotor on a plane containing both the rotational axis and the shortest distance between the rotational axis and said tilting pivot axis is at least as high as and preferably above said pivot axis, and that the said pivot axis is offset from the rotational axis in the direction of offset of the aerodynamic reaction line. A result of this arrangement is that in no condition of forward flight does the rotor axis lie between the aerodynamic reaction line and the said tilting pivot axis. Some of the reasons for so locating the tilting pivot axes will be brought out in the more detailed description hereinafter given.

In the case of a sustaining rotor of the type more particularly referred to, namely that wherein the rotor blades are articulated to a hub member by pivot means including generally horizontal pivotal axes, the preferred degree by which a pivot axis for controllable tilting of the rotor is offset from the rotor axis, as also the location of the said pivot axis in vertical direction, is to be determined at least in part by the distance of the horizontal pivotal axes of the blade articulations from the rotor axis. This follows from the fact that the position of the focal point on the rotational axis is determined by the distance of the horizontal blade pivot axes from the rotational axis, as hereinbefore pointed out. Thus, by way of illustration: in Figure 1, the blade articulation axes $a$—$a$ being spaced a considerable distance from the rotational axis $0$—$0$, the focal point $f^1$ is located relatively high; whereas in Figure 2, the blade articulation pivots $a'$—$a'$ being located somewhat closer to the rotor axis $0$—$0$, the focal point $f^1$ assumes a lower position; and in Figure 3, where the blade pivot means $a^2$ intersects the rotational axis $0$—$0$, the focal point $f$ is brought down to the plane of the rotor blades.

For reasons which will be brought out more fully hereinafter, the pivot axes $p^1$, $p^2$, etc., are preferably located below the focal point a distance determined by the particular blade articulation arrangement employed and by the stiffness and other operating characteristics of the control desired, it being noted that, in general, for any particular type of blade articulation, the stiffness of the control increases substantially in proportion to the distance of the tilting pivot axis from the focal point. The lateral offsetting of the tilting pivot axis from the central axis of rotation will also be influenced by the type and location of the blade pivot devices employed, in accordance with the particular operating characteristics desired. These points may be further elaborated upon, as follows:

Since the lines $0$—$0$, $1$—$1$, $2$—$2$, etc. (in Figures 1 to 3), and $0$—$0$, $2a$—$2a$, $4a$—$4a$, etc. (in Figures 4 and 5), representing the projections of the aerodynamic reaction line under various conditions of flight, diverge downwardly from the focal point, there will be a restoring moment about the pivot point $p$ acting on the rotor when it is angularly displaced from the equilibrium position which moment will be substantially proportional to the distance of such pivot point below the focal point $f^1$ (or $f$); while moments due to side-slip will be substantially proportional to the distance of the pivot point $p$ below the plane of the blade articulation pivots $a$ (or $a'$ or $a^2$, as the case may be). From this it follows that the degree both of stability (which is measured by the magnitude of the restoring moment) and of "stiffness" of the controls (which is measured by the magnitude of the forces which must be applied to the controls for tilting the rotor) is influenced by the vertical disposition of the pivot $p$, being in general greater the lower down the pivot is placed.

In order to obviate the transmission to the controls for rotor tilting of vibrations generated in the rotor, for example, by slight defects in mechanical balance or by other causes, a real or virtual axis about which the rotor as a whole is tiltable is preferably located in or closely adjacent the plane containing the horizontal pivotal axes of the blade articulation means. Usually the horizontal articulation pivotal axes will be coplanar but to cover the case of non-coplanar articulation pivots, as for instance, in a four-bladed rotor with staggered articulation pivots (as shown in my copending application, Serial No. 592,487, filed February 12, 1932, which issued as Patent No. 1,988,836), or in the case of inclined articulation pivots as hereinbefore mentioned, the expression "plane containing the horizontal pivotal axes" must be taken as including a mean plane approximately symmetrically placed with respect to said horizontal pivotal axes.

In certain specialized forms of aircraft, as for instance military aircraft, a very light control and rapid maneuverability are of more importance than stability, and in such case it is desirable to bring the pivot $p$ close to or coincident with the focal point $f$, which may be done by arranging the generally horizontal blade articulation pivot means to intersect the rotational axis, and locating the real or virtual pivotal axis or axes for rotor tilting to pass through the intersection of the horizontal blade articulation and rotational axes.

In Figure 1 the pivot $p^1$ is shown actually in the plane of the articulation pivots $a$. Since the latter are widely offset from the rotational axis the focal point $f^1$ is high and satisfactory longitudinal stability obtains. Such an arrangement is, however, inconvenient for structural reasons and in general it will be convenient to locate the pivots $p$ closely below the plane of the articulation $a$, as at $p^2$, $p^3$, $p^4$, $p^5$, in Figures 2 to 5.

Particular objects and advantages

Proceeding with certain of the more specific objects and advantages of the invention, the following will now be understood:

Although it has been shown that if the pivots about which the rotor is controllably tiltable are suitably located the aircraft can be made to trim at a speed within the flight range with free controls, and to possess satisfactory characteristics of longitudinal and lateral stability with free controls, yet it may be desirable to at least partially constrain the tilting of the rotor, and the invention therefore contemplates the provision of means for accomplishing this purpose. Such constraining means may include non-resilient damping means for checking any undesired tendency for the rotor to oscillate about its tilting pivots, and generally to render the control of rotor tilting smooth in operation.

The invention further contemplates that one or more elastic constraints for rotor tilting may be provided. For example, the fact that the mass center of the rotor, in the normal construction, is above the axes of the rotor tilting pivots introduces a tendency toward instability of the equilibrium of the rotor on such pivots, and such elastic constraints may be made use of to compensate this tendency toward instability.

The invention further contemplates that elastic constraints may be arranged to apply an elastic bias to the tilt of the rotor in one or more planes, and I further contemplate the provision of means for varying the degree of elastic bias, so as to enable the aircraft to trim at any required speed, and without list, with the pilot's hands off the controls.

Further, the elastic constraints may, if desired, be so arranged that at a certain angle of rotor tilt (in any plane of tilting) no force is exerted by the constraint, i. e., the bias is neutral for that angle, and means may be provided for varying the angle of tilt for which the bias is neutral.

It has been found as a result of flight experience, that if the rotor tilting pivot axes are so located that the trimming speed of the aircraft and/or the speed corresponding to lateral rotor equilibrium, i. e., no side-slip (the controls being free and no elastic bias applied), lies within the normal flying range, a tendency to instability both in pitch and roll may be manifested, more especially in gusty air. Furthermore, rapid changes of wind velocity in the line of flight seem to produce such undesirable effects. To overcome this difficulty, the invention contemplates a form of construction in which the pivot axis for controllable tilting of the rotor as a whole is so located that, at all speeds within the normal flight range, the projection (on a plane containing both the rotational axis and the shortest distance between the rotational axis and said pivot axis) of the line of resultant aerodynamic reaction of the rotor lies between said pivot axis and the rotational axis. This is equivalent to saying that the pivot axis is so placed that the trimming speed, or speed of no side-slip (according to whether we are considering the transverse pivot axis or the longitudinal pivot axis), with free controls and no elastic bias, is above the maximum speed of the normal flight range. This condition is illustrated in Figure 3 in which the pivot axis $p^3$ is located in front of the reaction line 5—5 corresponding to the normal maximum flight speed. With the rotor tilting pivots located in this manner, trimming, both longitudinal and lateral, at speeds within the normal flight range is achieved by the use of elastic biases.

In order to limit the angular range of rotor tilting in any plane fixed stop means are preferably provided, that for limiting the forward tilt of the rotor being conveniently so located, if desired, that it is impossible to hold the craft in a dangerously steep dive.

The transverse pivot for longitudinal rotor tilting is preferably located rearwardly of the center of gravity of the aircraft. More specifically, a line drawn from the center of gravity to the said transverse pivot axis may be inclined to a plane perpendicular to the longitudinal body axis of the aircraft at an angle of the order of six degrees. This ensures that the longitudinal body axis will assume a substantially horizontal attitude in cruising flight and a slightly nose-down attitude in a glide, as is desirable both in order to minimize body drag and to give the pilot a good view.

According to another feature of the invention, in addition to the means for controllably tilting the rotor, means are provided for bodily displacing the rotor as a whole in a direction generally perpendicular to the rotor axis. The last named means are preferably controllable in flight.

By bodily displacing the rotor longitudinally of the aircraft, the attitude of the body to the line of flight may be controlled in the longitudinal vertical plane independently of the speed of the craft and of the position of the center of gravity, so that the aircraft may always be flown at the best attitude and such variations of longitudinal trim as may be caused by alteration in the disposition of passengers, cargo, fuel and other disposable loads may be easily and perfectly compensated. Another advantage of this construction is that the full range of tilting of the rotor axis may be utilized for control purposes, in every direction of control, regardless of variable loading of the craft, since none of the tilting movement need be employed in compensating for different loadings. A further result, allied with the foregoing, is the fact that the degree of tilting required in the rotor may even be somewhat reduced, and thus the rotor may be mounted somewhat closer to the body of the craft, for a given desired clearance between the rotor blades and the propeller, when the rotor is at maximum forward tilt, for example.

According to another feature of the invention, the aircraft is so constructed that the aerodynamic stability of the body (including all associated parts, such as undercarriage, airscrew etc.) independently of the rotor is positive in yaw and positive or at least neutral in pitch and roll, small auxiliary non-rotative surfaces being provided for this purpose, if required.

To achieve stability of the body in pitch a small non-rotative horizontal tail plane may be employed, the "volume" of which, i. e., the product of its area and lever arm about the center of gravity, is substantially less than (for example, about two-thirds of) that which would be required for effectively stabilizing the whole aircraft in pitch if the rotor axis were fixed relatively to the body.

The foregoing features, objects and advantages of the invention, together with numerous others, will appear still more clearly from the following description of the structural embodiments of the invention.

*Description of three structural embodiments*

Referring first to the embodiment of the invention shown in Figures 6 to 12 inclusive, the aircraft includes a body 1, engine 2, driving a propulsive airscrew 3, main supporting wheels 4 mounted on undercarriage struts 5 and a pyramidal supporting structure composed of struts 6 at the apex of which is mounted the rotor. This latter comprises wings or blades 7 secured to or mounted on a hub member 8 by any suitable pivot means, such as horizontal pivots 9; links 10 and vertical pivots 11 being also preferably provided. The rotor blades may normally operate at negative or neutral incidence settings but are preferably set at a slight positive-lift incidence (for instance between 2° and 5°) calculated with relation to a plane perpendicular to the axis of rotation, as indicated by the trailing edge 7a, by which their effectiveness as to lift and control is enhanced. Their movements on their individual pivots may be controlled and/or limited by mechanism similar to that hereinafter described with reference to Figures 13 to 16.

Even at positive-lift incidence relative to their rotational path, the rotor blades may be autorotatably (i. e. aerodynamically) actuable, but I do not herein claim such a feature per se, as it constitutes subject-matter of my prior-filed copending application which has issued as Patent No. 1,947,901.

Figure 10:
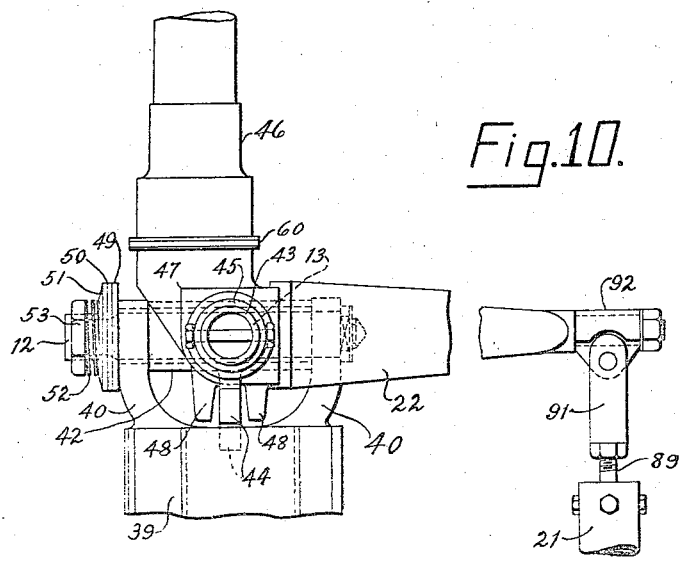
Figure 10 is a rear elevational view of the rotor axis mounting structure employed in the machine of Figures 6 to 9.

The hub 8 is mounted on (or forms part of) an axis structure illustrated in Figures 9 and 10, the whole being pivotally mounted on the pyramid 6 by means of a transverse pivot 12 for longitudinal rotor tilting and a longitudinal pivot 13 for transverse tilting. The pivot 12 is located slightly forwardly of the rotational axis of the rotor, the latter axis being indicated by the line 0—0. Further the pivot 12 is arranged below the plane of the articulation pivots 9 but as near this plane as the structural conditions will permit. Similarly the longitudinal pivot 13 is offset from the rotor axis 0—0 in the direction of the retreating rotor blade, the direction of rotation being indicated by an arrow in Figure 7. To assure proper operation of the control pivots 12 and 13 in their bearings, a lubricant reservoir 13c, having ducts leading to the bearings of both pivots, is closely associated with said pivots, as by being formed inside one of them, as shown.

The center of gravity of the aircraft is indicated at $g$, and the line joining the point $g$ to the pivot 12 makes an angle of approximately six degrees with a plane perpendicular to the longitudinal body axis $l$—$l$ of the aircraft, as shown. It will also be observed that the propeller axis $x$—$x$ is inclined so as to pass approximately through the center of gravity $g$, and that the rotational axis 0—0 (when the rotor is in the mid position on its longitudinal control pivot 12) is slightly rearwardly inclined from a true perpendicular to the longitudinal body axis $l$—$l$. The center of gravity $g$ is also slightly ahead of the said mid position of the axis 0—0. The foregoing cooperative relation between the several axis lines referred to results in a substantially stable and balanced condition in normal cruising flight.

Control of the rotor tilting both longitudinally and transversely, is effected by means of a control column 14 of the usual type (see especially Figures 11 and 12), arranged in a pilot's cockpit 14a; longitudinal tilting of the rotor being effected by longitudinally rocking the control column and the movement of the latter being transmitted by means of a rod 15, bell crank 16, rod 17 and arm 18.

Transverse rocking of the column 14 is transmitted by means of a rocking shaft 19, crank 20, rod 21 and arm 22 to effect transverse tilting of the rotor.

On the rear end of the aircraft body 1 is mounted a fixed vertical fin 23 and a rudder 24 on which is mounted a double-ended lever 24a connected by means of cables 25 with a rudder bar 26 having pedals 26a.

On the rear end of the body are also mounted small horizontal stabilizers 27 having sufficient area to endow the body (together with its various fixed appendages, such as the undercarriage and rotor mounting pyramid) with a positive degree of stability in pitch. The stabilizers 27 are braced to the body by struts 27a and pivotally mounted to rock about an axis 28, their incidence being adjustable through a small angle by means of a rod 29, bell crank 30, cables 31 and a hand lever 32 which can be secured in any desired position by means of a ratchet quadrant 33.

The rear end of the craft is supported on the ground by a steerable tail-wheel 34 carried in a fork 35 which is pivotally mounted in the body at 36. Steering of the tail-wheel is effected by means of cables 37 which incorporate springs 38 and are attached to the rudder controlling cables 25.

It will be noted that the main wheels 4 are situated markedly forward of the center of gravity $g$, the line joining the wheel center to the point $g$ being inclined backwardly with respect to the ground line $e$—$e$ (when the aircraft is resting on all three wheels) at a much more acute angle than is usual in the case of ordinary aeroplanes. This angle is so chosen that the aircraft will not nose over on the ground with the wheels braked or chocked, even though the rotor is receiving the maximum power transmittable thereto by the rotor starter and/or with the airscrew developing its maximum thrust, even when the craft is standing on a small forward slope, in spite of the fact that there are no elevators by which a large down load might be applied at the tail through the action of the slipstream.

Referring particularly to Figures 9 and 10; the upper ends of the pyramid or pylon struts 6 are bolted to an apex member 39 incorporating a fork 40 carrying the transverse pivot pin 12 on which is rotatably mounted, by means of a bushing 41, an intermediate member 42 incorporating a backward projection 43 and a downwardly projecting flange 44, the latter serving to limit the angular movement of the member 42 about the pivot pin 12 by contact with vertical faces 39a, formed on the member 39.

The rear part of the member 43 serves for mounting the arm 18, while the part immediately in the rear of the pivot pin 12 forms the longitudinal pivot pin 13 on which is mounted, by means of a bushing 45 a rotor axis member 46 whose lower part 47 is longitudinally bored to embrace the pivot 13. On the bottom of the part 47 are formed a pair of lugs 48 embracing the flange 44 and serving by contact therewith to limit the movement of the axis member 46 about the pivot 13. As shown in Figure 10 the arm 22 is fixed to the part 47 of the axis member 46.

Movement of the member 42 about the pivot 12 is damped by means of a friction device consisting of a washer 49 secured to the fork 40, a friction washer 50, a clamping washer 51, a spring 52 and a nut 53, carried on a threaded extension of the pivot pin 12, adjustment of the frictional resistance being effected by tightening or slackening the nut 53.

Movement of the part 47 about the pivot 13 is constrained by a similar friction device comprising a flange 54 formed on the rear end of the part 47, a friction washer 55, a clamping washer 56, a spring 57 and an adjustable clamping nut 58, the latter being carried on a threaded part of the lever 18. The rotor hub 8 is mounted on the axis member 46 by means of combined thrust and radial bearings 59.

The axis member 46 further comprises a collar 60 on which are secured the two halves of a split bracket member 61, 62, to the forward part of which is attached a housing 63 in which are journalled shafts 64, 65 which can be coupled together by means of a dog clutch 66, 67, the shifting member 67 of which is controlled by a striking fork 68, lever 69; actuating cable 70 and return spring 71. On the upper end of the shaft 65 is formed a pinion 72 meshing with a crown wheel 73, which is bolted to the hub member 8 and carries a hydraulic packing 74 which retains the lubricant carried in the hub 8 for the bearings 58.

The inner face 75 of the crown wheel serves as a brake drum. With it coact a pair of brake shoes 76 pivoted on an axle 77 carried by the forward half 61 of the split bracket. The shoes 76 are actuated by a cam 78 whose shaft 79 is journalled in the rear half 62 of the bracket member and carries an actuating lever 80, which is connected to a control in the cockpit by a flexible connection (not illustrated).

The shaft 64 receives its drive from an upwardly extending shaft 81 through a telescopic joint 82 and a universal joint 83. The shaft 81 is driven by the engine 2 through drive elements generally indicated in Figure 6 at 84, 85.

Referring to Figure 9, the rods 17, 21 are of tubular construction and are resiliently connected with the arms 18, 22 respectively by means of columns of rubber rings 86 in compression, which bear against abutments 87 secured to the tubular member 17 and against a collar 88 formed on a rod 89 which is slidable longitudinally of the tubular member 17, being guided in the abutments 87 and connected to the arm 18 by means of a forked shackle 90.

A similar rod 89 similarly mounted in the tubular rod 21 is connected with the arm 22 by means of fork 91 and an eyed swivel 92, which allows for changes in the fore and aft alignment of the rod 21 consequent on the tilting of the member 42 about the pivot 12.

Figure 12:
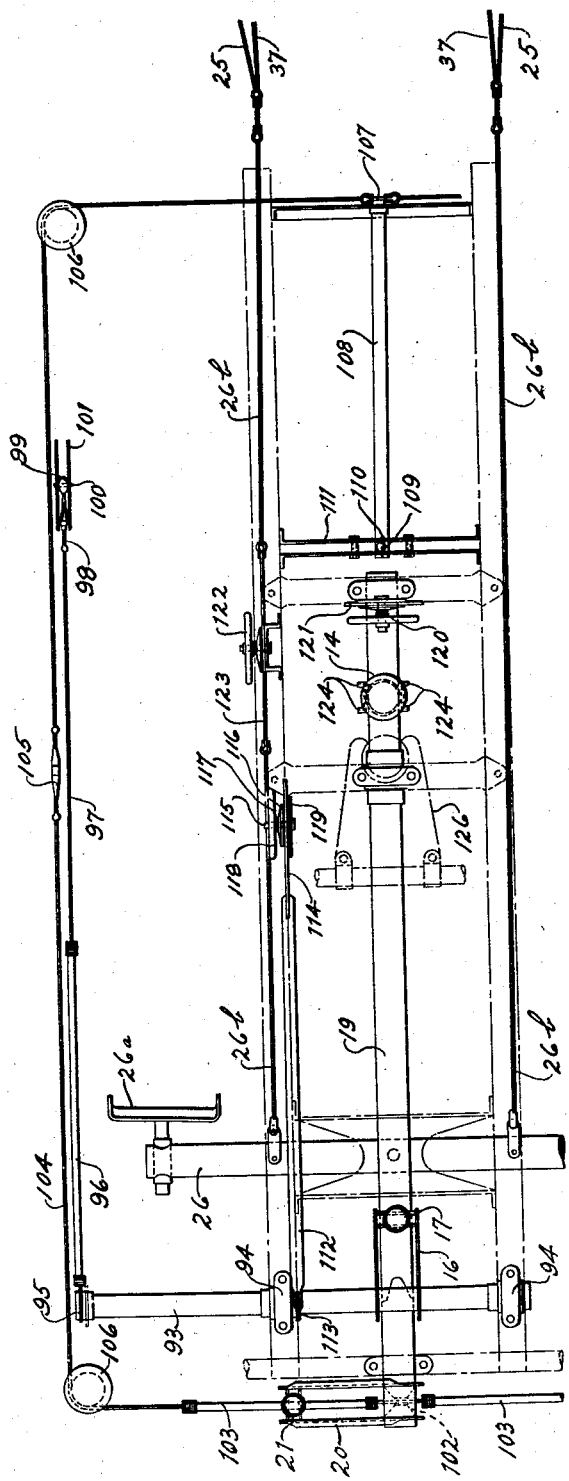
Figure 12 is a plan view of the controls shown in Figure 11.
Figure 1B:
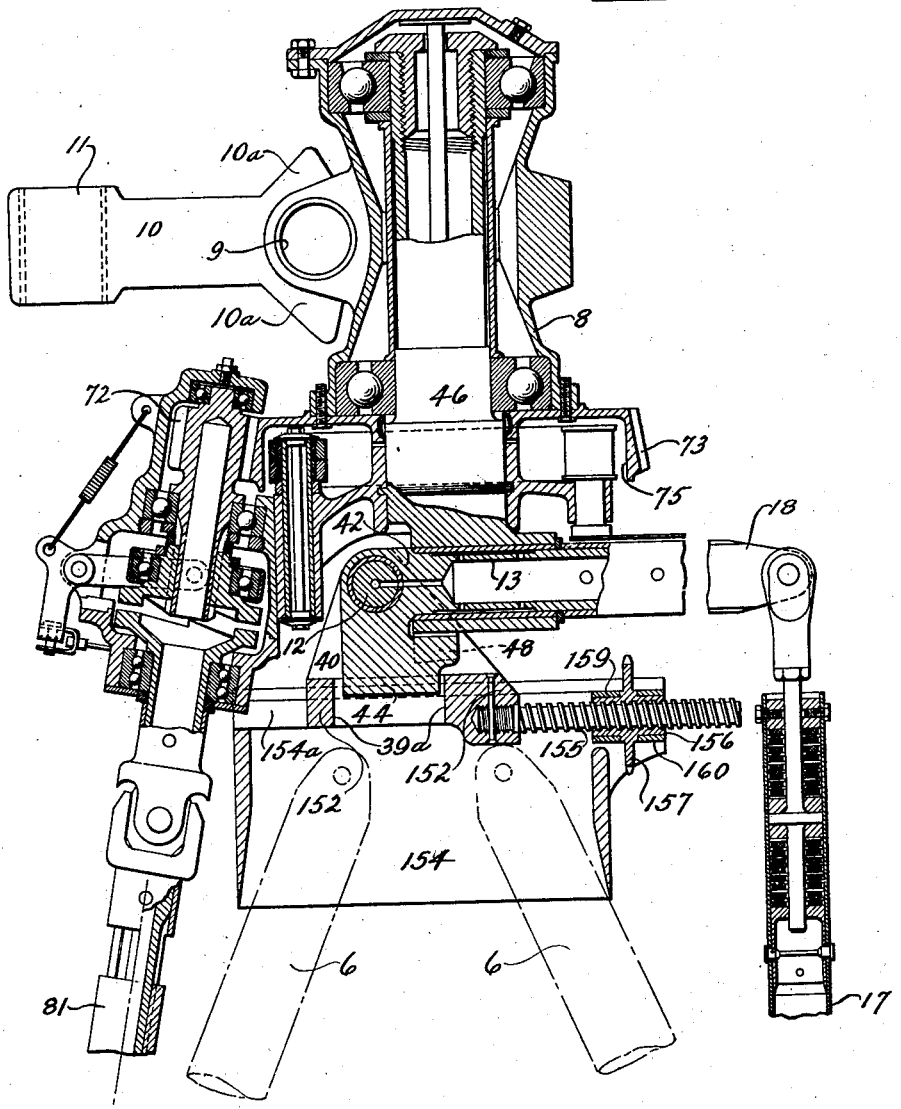

Referring to Figures 11 and 12; the controls for the rotor tilting include in addition to those parts already described, a transverse rocking shaft 93 on which the bell crank 16 is mounted. This rocking shaft is mounted in supports 94, and carries at one end a double lever 95 to the ends of which are shackled elastic cords 96 which are connected by cables 97 and adjustable tensioning devices 98 with a hand lever 99, having a spring-catch 100 engaging a notched quadrant 101. By this means an elastic bias may be applied to the longitudinal tilt of the rotor, the rotor axis position corresponding to zero bias, i. e., equal tension of the two cords 9, being determined by the position of the hand lever 99 and the force exerted by the bias being adjustable by means of the devices 98.

A similar elastic bias arrangement for the lateral tilting of the rotor comprises a vertical lever 102 mounted on the forward end of the rocking shaft 19 and elastic cords 103 shackled to cables 104 incorporating tensioning devices 105 and led over pulleys 106 for attachment to a vertical lever 107 mounted on a longitudinal rocking shaft 108, carrying at its forward end a hand lever 109 having a spring catch 110 for engagement with a notched quadrant 111.

As shown in Figure 12, the rudder cables 25 and tail wheel cables 37 are together shackled to cables 26b whose forward ends are shackled to the rudder bar 26.

All the controls may be completely or partially locked by means of frictional devices; that for the longitudinal controls consisting of a rod 112 pinned at one end to a lever 113 mounted on the cross shaft 93 and fixed at its other end to a slotted plate 114 embracing a threaded pin 115 carrying a clamping washer 116, cushioning spring 117 and adjustable nut in the form of a hand wheel 118, whereby the plate 114 may be gripped against an abutment plate 119.

A similar friction locking device for the transverse rotor tilting control, generally indicated at 120, serves to clamp a slotted quadrant 121 mounted on the rocking shaft 19. For the rudder control a friction device 122, similar to those for the rotor controls, serves to clamp a slotted plate 123 incorporated in one of the cables 26b.

The control column 14 is of tubular form and is extended by means of a pair of plates 124 secured to its lower end, which plates are pivoted at 125 for longitudinal rocking on the rocking shaft 19. The control column 14 may be locked in its most forward position by means of a forked plate 126, hinged about a transverse axis, and having mounted thereon a lever 127 anchored to a fixed point by a spring 128.

As will be seen from Figure 11, the spring 128 is so arranged that normally the plate 126 is held clear of the control column 14 but when rocked back to embrace the column 14 the spring 128 is passed over a dead center so that the forked plate 126 is now held in engagement with a collar 129 formed on the column 14, thus holding the latter firmly in position.

The second embodiment of the invention is illustrated in Figures 13 to 19, now to be referred to.

The aircraft of this embodiment is similar in many respects to the former, and parts which are similar in both embodiments are or may be designated by like reference numbers, and need not be further described here. The aircraft illustrated in Figures 13 to 19 differs, however, from that of Figures 6 to 12 especially in the following particulars.

Firstly, the control of the aircraft by tilting the rotor (longitudinally and transversely) is supplemented by elevators and ailerons. Thus the aircraft is provided with small fixed wings 130, braced to the fuselage as by struts 131, these wings having upturned tips 132 for maintaining lateral stability, especially at high speeds, and carrying ailerons 133.

A tail plane 134 is also provided, to which are hinged elevators 135. The latter are provided with an operating lever 136 which is connected to the control column 14 by means of a rod 137, bell crank 138 and a second rod 139.

The ailerons 133 are mounted on torque tubes 140 whose inner ends project into the body (see Figures 18 and 19) and carry levers 141 which are connected by vertical rods 142 with a double-ended cross lever 143 mounted on the rocking shaft 19.

In the second place, the control of the ailerons is by means of a wheel instead of the lateral rocking of the control column, and it will be seen that the hand wheel 144 is mounted in bearings at the upper end of the control column 14 and carries a sprocket 145 over which is led a length of chain 146, the ends of which are connected by tie-rods 147 with a double-ended cross lever 148 mounted on the rocking shaft 19. Since the control column 14 is only required to rock longitudinally, the rocking shaft 19 is terminated immediately behind the lever 148 and, being hollow, forms a spigot bearing 149 for the forward end of a short shaft 150 which is rigidly fixed in a bracket 151 and carries a pivot 125 on which the extension plates 124 of the column 14 are mounted.

Thirdly, the mounting of the rotor embodies means of bodily displacing the whole rotor longitudinally of the aircraft.

Figure 17:
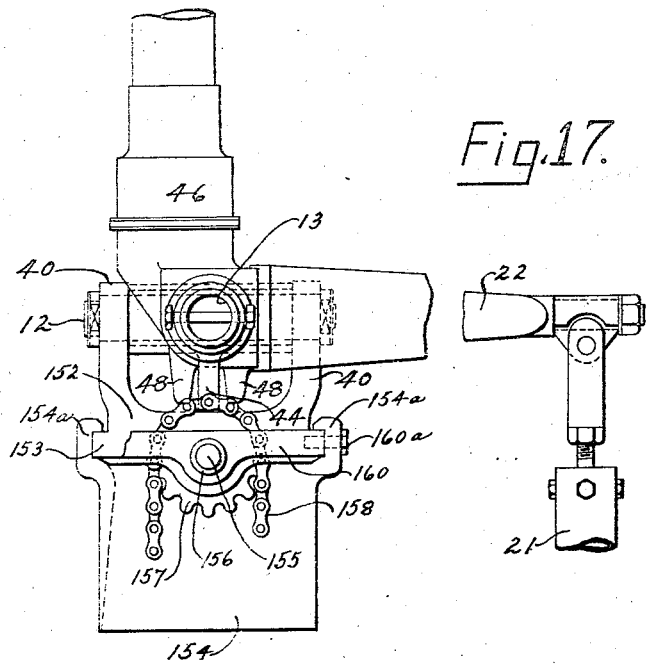
Figure 17 is a view somewhat similar to Figure 10, but illustrating, in rear elevation, the mounting of the rotor axis member of the machine of Figures 13 to 16.

Thus, referring to Figures 13, 16 and 17, the fork 40 in which is mounted the transverse pivot 12 is formed on a movable carriage 152 provided with side flanges 153 which fit slidably in guides 154a formed in an apex member 154 which is secured to the upper ends of the pyramid struts 6.

A quick pitched screw 155 is screwed and pinned into the rear end of the member 152, and on it is threaded a nut 156 carrying a sprocket 157 over which is led a chain 158, the sprocket 157 being axially located between thrust collars 159, 160, which are provided with integral side lugs fitting into the guideways 154a of the member 154 and secured there by set screws, as shown at 160a (Figure 17).

The vertical stop faces 39a which coact with the flange 44 of the member 42 are formed on the carriage 152, as shown in Figure 16. Other parts of the rotor head assembly are substantially the same as those illustrated in Figures 9 and 10.

Referring to Figures 13, 18 and 19, the ends of the chain 158 are attached to cables 161 which are led down into the body of the aircraft and over pulleys 162, their ends being joined by a second length of chain 163, which is led over a sprocket 164 which is secured to a hand wheel 165, by the manipulation of which the fore and aft position of the sliding carriage 152 and hence of the whole rotor may be adjusted, for example to compensate for variable loading of the craft which may cause a shifting of the center of gravity of the craft, for instance between the points $g^1$ and $g^2$ (see Figure 13).

In the embodiment of the invention just described (the second embodiment) I have shown means for limiting and/or controlling the movements of the blades on their pivots, a similar mechanism being equally applicable to the structures of the first embodiment heretofore described and the third embodiment hereinafter to be described. Such mechanism preferably comprises, in general, a cantilever support of the blades from the hub; and for the specific blade pivot arrangement shown, it specifically comprises, for each blade, limiting stop devices 10a to limit particularly the downward droop of the blades about their horizontal pivots 9; and for each blade a friction control device 11a associated with the vertical pivot 11, which acts to control and limit the swinging movements of the blades about their vertical pivots.

The third embodiment of the invention is illustrated in Figures 20 to 23.

Referring to Figure 20; the aircraft in this case is rudderless, elevatorless and without fixed wings, being controlled in flight entirely by controlled tilting movements of the rotor, except of course for the control of the engine.

The body, indicated as before at 1, with engine 2, tractor airscrew 3, main wheels 4, undercarriage struts 5, tail wheel 34 and pilot's cockpit 14a, is rendered stable in yaw, pitch and roll by means of a vertical fixed fin 166, a small horizontal stabilizer 167, and a stream-lined fairing 168, respectively, the latter being enlarged at 169 and enclosing the rotor mounting structure and providing fin surface above the center of gravity.

The aircraft in this embodiment is provided with a two-bladed rotor comprising blades 7, which are articulated to the hub member 8 by vertical pins 11, links 10 and a single horizontal pivot 170 common to both blades. As before, the axis structure of the rotor is pivoted for longitudinal and transverse rocking about pivot pins 12 and 13 respectively, control being effected as before by means of a rearwardly extending arm 18 and vertical rod 17 and a lateral arm 22 and rod 21.

An inclined drive shaft 171 extends from the rear of the engine to the rotor head, its lower end being received into a casing 172 mounted on the back of the engine 2 and containing the necessary gearing together with a dog clutch, the details of which are not illustrated but which is controllable by an arm 173 to which is attached a cable 174, led over a pulley 175 into the pilot's cockpit. Suitable forms of such gearing and clutch mechanism may be seen in my copending application Serial No. 631,355, filed September 1, 1932, which issued as Patent No. 2,037,766.

The main rotor supporting element consists of a single vertical mast or pillar 176, which is enclosed, together with the rods 17 and 21 and the rotor head assembly in the fairing 168. The pillar 176 may be anchored and braced to the structure of the body 1 in any suitable manner, as by rigid supports 176a attached to diagonal bracing elements 176b of the fuselage.

The undercarriage wheels 4 are provided with brakes, the detail of which is not illustrated as they may be of any suitable known type, but their operating levers are indicated at 177, these levers being connected by any suitable means such as a "Bowden" control, diagrammatically shown at 178, to operating gear in the cockpit, which will be further described.

Figure 21:
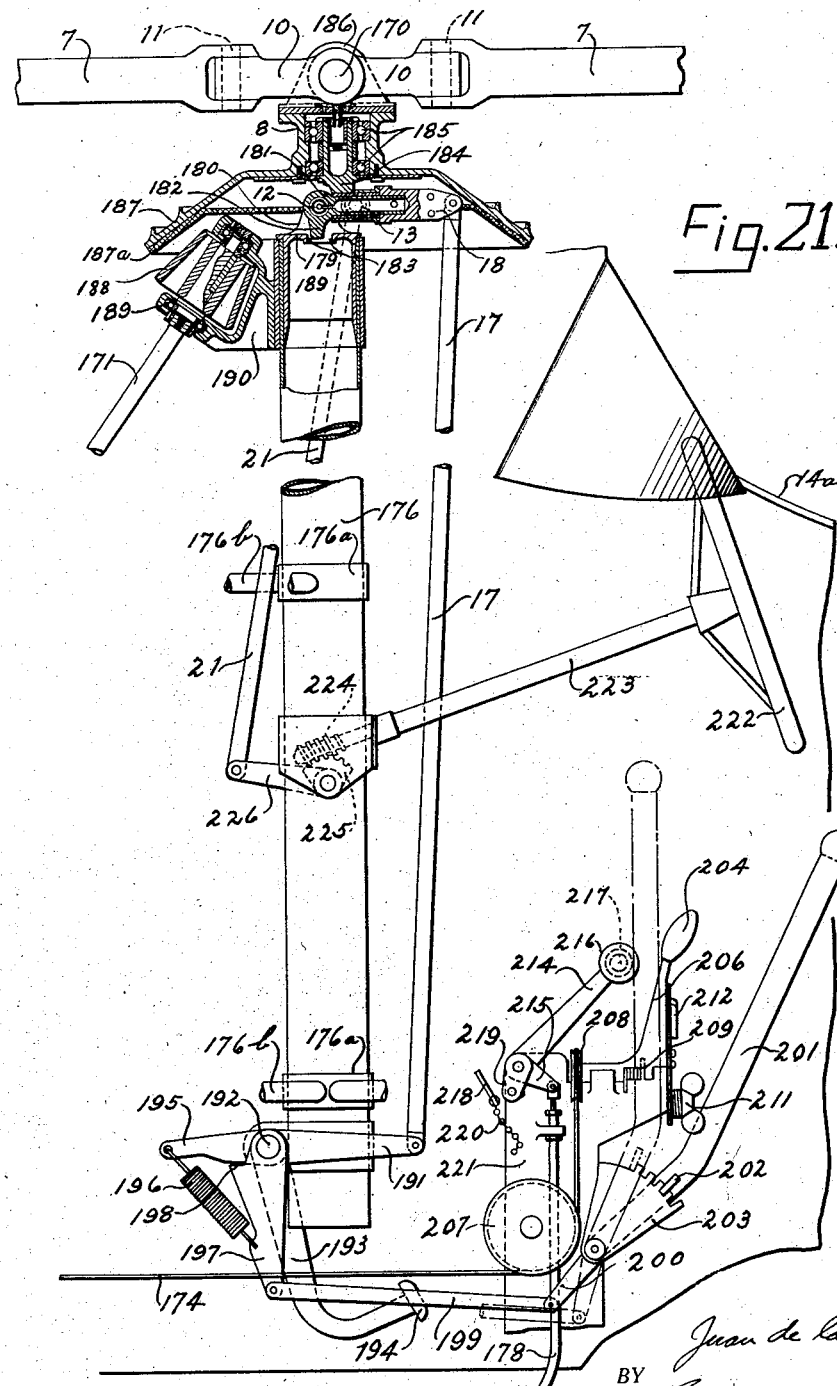
Figure 21 is an enlarged side elevation, partly in section, of the rotor mounting assembly and the controls.
Figure 23:
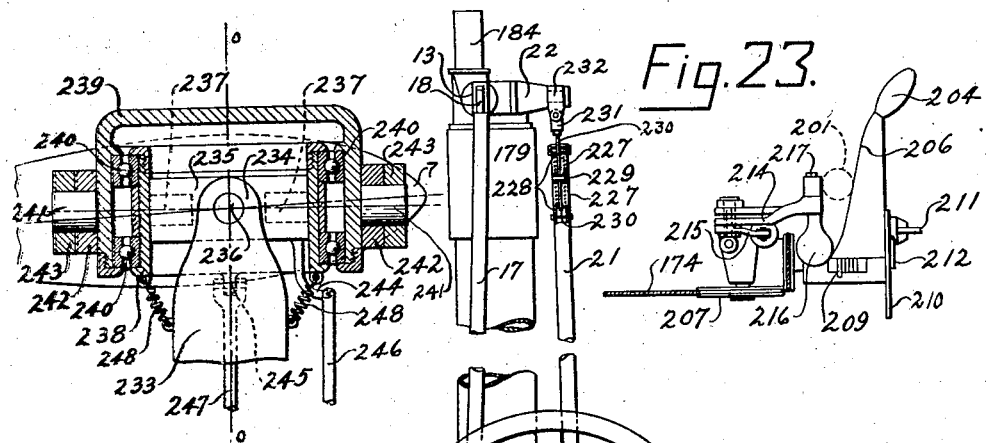
Figure 23 is a plan view showing certain details of the controls of the aircraft of Figures 20 to 22 inclusive.
Figure 22:
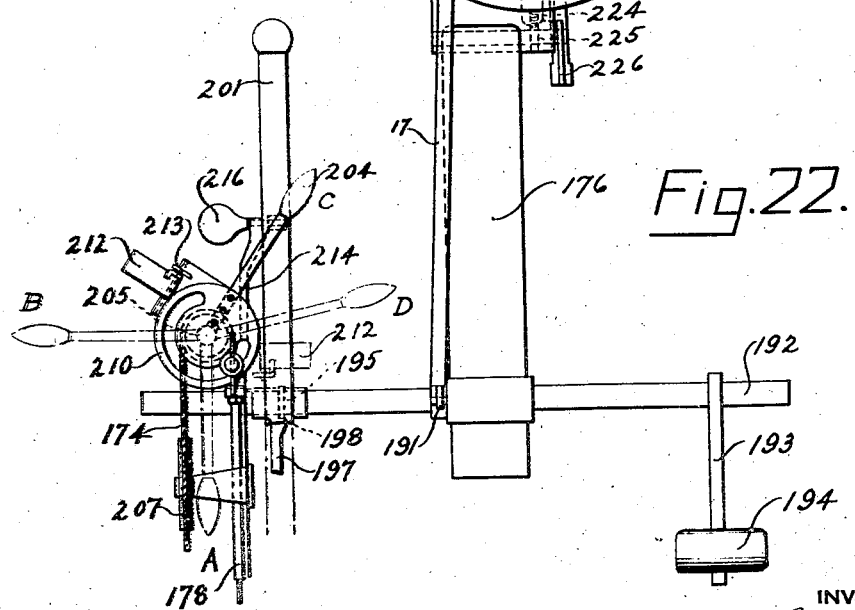
Figure 22 is a rear elevation of parts of the mechanism shown in Figure 21.

Referring to Figures 21 to 23; the pillar 176 is of tubular form and to its upper end is secured an internal socket 179 on which is formed a fork 180 which carries the transverse pivot pin 12 on which is rotatably mounted an intermediate member 181. The rocking movement of this member about the pivot pin 12 is limited by a part 182 of the member 181 which projects downwardly between a pair of jaws 183 forming part of the socket 179. The member 181 comprises a rearward projection forming the longitudinal pivot pin 13 on which is rotatably mounted an axis member 184, the lower part of which is formed with a horizontal bearing to embrace the pivot 13.

As before, the rotor hub member 8 is rotatably mounted on the axis member 184 by means of bearings 185. In this case, however, a single-eyed lug 186 is secured to the upper face of the hub member 8. This lug 186 carries the single horizontal pivot pin 170 of the blade articulations, the links 10 being provided with forked ends journalled on the pin 170 and embracing the lug 186.

The hub member 8 terminates downwardly in a cone 187, the inner face of which is lined with frictional material 187a. When the rotor is tilted forwardly about the pivot 12 substantially to its furthest extent, the friction lining 187a engages with a friction cone pinion 188 mounted on the upper end of the drive shaft 171 and journalled at 189 in a bracket member 190 which is mounted on the upper end of the column 176.

The pivot pin 13 forming part of the pivot member 181 is extended rearwardly to carry the lever 18 which is connected with the rod 17 while the side lever 22 is secured to the side of the axis member 184. The lower end of the rod 17 is pinned to a lever 191 mounted on a transverse rocking shaft 192 to which is also secured a lever 193 terminating in a foot pedal 194. The rocking shaft 192 also has fixed thereon a lever 195, the end of which is coupled by a strong tension spring 196 with a lever 197 loosely mounted on the shaft 192 and including a stop 198 arranged to bear against the under-side of the lever 195.

The rod 199 couples the lever 197 with a lever 200 forming the lower extension of a hand lever 201 provided with a spring catch 202 engaging the notches of a fixed quadrant 203.

Normally, the spring 196 holds the stop 198 hard against the lever 195 so that the lever 197 moves with the lever 195 and the rocking shaft 192. Thus the longitudinal tilt of the rotor is normally controlled by the hand lever 201 through the elements 200, 199, 197, 195, 192, 191, 17 and 18.

Since the aircraft possesses inherent longitudinal stability, continual manipulation of the longitudinal rotor tilt by the pilot is unnecessary and the lever 201 may be locked by means of the catch 202, in a position corresponding to the desired speed of flight.

The rotor may, however, be tilted backwards rapidly to increase its angle of incidence, as is required, for instance in landing, by means of the pedal 194 which being directly coupled to the rocking shaft 192, overrides the hand control by the lever 201 (if the latter is locked by means of the catch 202), the spring 196 yielding and allowing the lever 195 to lift off the stop 198. This arrangement may readily be used to obtain quickly a powerful retarding force as against forward movement of the craft.

It will be clear that on releasing the pedal 194 it is powerfully returned by the spring 196 to its normal position. The spring catch 202 may be provided with quick release means which are not illustrated, since any suitable type may be used.

Engagement of the cone pinion 188 with the friction face 187a of the rotor hub cone 187 is effected by tilting the rotor forward to its furthest extent by means of the hand lever 201, the forward part of the quadrant 203 being cut away as shown, to enable a steady and smooth pressure to be applied. This pressure may be applied directly by hand or by means of a supplementary member 204 (see Figures 21 to 23) pivoted about a fore and aft axis 205 and having its forward edge formed as a ramp or cam 206 which applies a forward pressure to the lever 201 when the handle of the lever 204 is pressed in a clockwise direction when viewed from the rear.

Further, the cable 174 which operates the dog clutch located in the transmission housing 172 is led upwardly over a pulley 207 and attached to a pulley 208 carried on the forward end of the lever 204.

Referring more particularly to Figure 22; four positions of the lever 204 are shown, designated by the reference letters A, B, C and D, position C being indicated in full lines and the others in dotted lines. The normal position of the lever is at A, to which it is biased by means of a spring 209 (see Figures 21 and 23).

When the lever is rotated in a clockwise direction the cable 174 is pulled and thereby the lever 173 is rocked to engage the dog clutch in the housing 172 (see Figure 20). This dog clutch is fully engaged by the time the lever has reached the position B.

Further movement of the lever, to the position C, brings its forward cam face 206 into engagement with the rear face of the lever 201, the latter having been previously pushed forward into the position shown in dotted lines in Figure 21.

Further pressure on the lever 204, in a clockwise direction from C to D, exerts a forward pressure of the lever 201 with steady increasing leverage, thus assuring the complete engagement of the cones 187 and 188.

It may be noted that the spring 196 must be sufficiently strong to transmit the engaging pressure of the cones 187 and 188 without appreciable stretching and for this purpose should have considerable initial tension when the lever 195 is engaged with the stop 198.

On the lever 204 is mounted a slotted disc 210 which can be clamped in any position by means of a wing-nut 211. To the disc 210 is hinged a stop plate 212 loaded by a spring 213. When the lever 204 is in its normal position A, the stop plate 212 is in the position shown in dotted lines. In this position it is interposed in the path of the lever 201 and prevents it from being rocked forward sufficiently to bring the cones 187, 188 into engagement. If, however, the lever 201 is in front of the plate 212, the spring 213 enables the latter to yield and permit the lever 201 to be pulled back past the plate 212.

Thus, the assembly of the lever 204 and stop plate 212 insure:

(1) That the cones 187, 188 cannot be engaged in normal flight.

(2) That the rotor cannot normally be tilted forward sufficiently to cause a dangerous dive.

(3) That in engaging the transmission for starting the rotor, the dog clutch in the housing 172 is engaged before the friction cones.

(4) That the dog clutch cannot be engaged with the friction cones already engaged.

Further a lever 214 is provided which controls the wheel-brakes through an arm 215 and the "Bowden" cable connection 178. This lever is provided with a hand knob 216 and a roller 217 projecting in the path of the lever 201, so that when the latter is pressed forward to engage the cones 187, 188 the lever 214 is pressed forward and automatically applies the wheel-brakes.

In order to lock the wheel-brakes "on" for parking purposes, a pin 218 is provided whereby the lever 214 may be locked in the applied position, the lever 214 being provided with a lug 219 with a hole for the pin and the latter being conveniently attached to a chain 220. In the present example, the assembly including the quadrant 203, the lever 204 and the lever 214 are mounted on a bracket member 221.

The starting of the aircraft involves the following sequence of operations. The engine having been started and the parking pin 218 withdrawn, the lever 201 is pressed forward until it is retained by the most forward notch of the quadrant 203. The lever 204 is then rotated in a clockwise direction, looking from the rear, from the position A through B and C to the position D. Thus the dog clutch is first engaged, after which forward pressure is applied to the lever 201 to engage the cones 187, 188. At the same time the lever 214 is pressed forward to apply the wheel-brakes, and so prevent the aircraft from moving on the ground when the engine is opened up to impart the initial rotation to the rotor.

When the latter has been speeded up, the lever 204 is released and is returned by its spring 209 to the position A, thus releasing the engaging pressure of the cones 187, 188, disengaging the dog clutch and releasing the wheel-brakes. The aircraft is now in a position to be taken off.

The transverse control of the rotor is through a hand wheel 222, column 223, worm 224, sector 225 and arm 226, which is coupled to the rod 21. Connection of the rod 21 with the lever 22 is of a resilient nature, comprising compression springs 227, bearing against abutments 228 secured to the tubular rod 21 and against a collar 229 formed on a rod 230 slidable in the abutments 228 and terminating in an eye 231, which is pinned to a swivelling shackle 232 carried by the lever 22.

Thus the transverse control of the rotor includes an irreversible control element represented by the worm 224 and sector 225 and a resilient element 227 etc. which is located between the irreversible element and the rotor.

Figure 24:
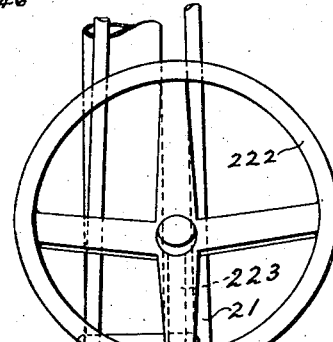
Figure 24 is a longitudinal vertical mid section through a modified rotor hub, adaptable to any of the three machines illustrated.

In Figure 24 I have shown a rotor head construction by which the focal point is not only brought down to the plane of the wings, but the tilting pivot axes are also located at said plane and right on the focal point, which makes for extremely easy rotor control in all directions and thus the most ready maneuverability of the machine. The rotor head is also made much more compact, whereby parasite drag is reduced to a minimum.

Referring to the figure, the pylon apex or other fixed support is fragmentarily shown at 233. This carries a pair of lugs 234 between which is mounted a block 235 by means of a transverse tilting pivot 236. A longitudinal pivot axis, for transverse rotor control, is constituted by two pins 237 secured inside the non-rotative axis member 238, at right angles to the axis of the pin 236.

On the outside of axis member 238 is mounted the rotor hub 239 by means of bearings 240. Blade articulation pivots 241 are mounted upon the outside of the hub 239, in the same plane as the tilting pivots. This arrangement is shown for a two-bladed rotor, one blade of which is secured on the pins 241 by means of the fork ends 242, and the other blade of which is secured thereon by means of the fork ends 243.

Control by the rotor is effected, longitudinally and laterally, respectively, by the arms 244 and 245, connected at right angles to one another, respectively to the block 235 and the axis member 238; longitudinal and lateral control push rods 246 and 247 being provided for connection to the control mechanism in the cockpit. This rotor head may be constrained toward neutral position by means of springs 248.

Figure 24a illustrates the form of hub of Figure 24 associated with the form of rotor drive of Figures 20 to 23 inclusive. Here it will be seen that the rotor hub 239a terminates downwardly in a cone 187b lined with friction material 187a adapted to cooperate with the friction cone pinion 188 which is mounted by bracket 190 on the supporting mast 233.

As in the embodiment of Figures 20 to 23 inclusive, the rotor drive is engaged by tilting the hub 239a forwardly to its furthest position.

*Brief summary of general advantages*

As to all illustrated embodiments of the invention, there is the primary advantage of placing the main burden of the control of the craft, as well as of the sustention of the craft, in its rotor, which, with its wings positioned in the autorotational incidence range, is assured of continuous rotation by aerodynamic action as long as the craft is in flight, with the result that adequate control is at all times available, even in vertical descent, without engine power, at which time there would normally remain little or no effectiveness in ordinary control surfaces; and furthermore, as to all embodiments of the invention, the rotor, though capable of use for controlling the craft, retains also its capability of obviating differential lift and gyroscopic precessional effects. This is accomplished, in the three general illustrative embodiments shown, by the mounting of the rotor blades in such manner that they are capable of variation in aerodynamic angle of attack, and in fact the aerodynamic action itself causes the blades to "follow" the movements of the rotor axis, so that the actual tilting of the rotor for control purposes involves the application of very little more force than would be necessary simply to tilt the hub alone, especially where (in a rotor such as shown) the rotor blade articulations are close to the rotational axis, thus lowering the focal points, and the tilting pivots are located close to the plane of the blade articulations, and thus also close to the focal points.

This improved control, in any of the three general embodiments illustrated, or in any other practical embodiment which might be built, involves, so far as I am aware, not only for the first time in the autorotative winged aircraft art, but also for the first time in the development of heavier than air craft, the ability to accomplish any style of flight, including substantially vertical descent on an even keel, even without power, under practically full control at all times. Thus, even when coming in to a landing in a restricted space with practically no forward speed of the machine with relation to the air, a safe and easy landing can be made, under full control, without danger of uncontrollable drift or sideslip, or resultant tipping or nosing over of the machine, so that risks, damage, and breakage of rotor blades are greatly minimized.

A further advantageous characteristic of several embodiments of the invention illustrated is the horizontal offsetting of the tilting pivot axes with respect to the center of the rotor hub, by which the aircraft tends to trim, with the body at the proper attitude, at the chosen cruising speed, even with the controls left free.

A further advantage common to several embodiments is the irreversibility of, or alternatively the capability of locking, one or more of the controls, so that the burden of distance flying is reduced.

The rotor drive and brake mechanisms are so arranged that they do not interfere in any way with the rotor control operation or with the pivotal movements of the rotor blades, nor will they prevent autorotative operation of the rotor, in the embodiments illustrated.

Several illustrated embodiments of the invention, by the combination of a pivoted wing rotor, and a body having positive stability in yaw, pitch and roll, make possible the utilization of the rotor as a primary or sole means of control, which is very effective over the entire flight range, from full forward speed to approximately zero forward speed. A further characteristic, resulting from control of the craft by the rotor, is the fact that the attitude of the body need not be manipulated up and down, during take-off, but in fact the body may remain on all three of its supporting elements, at a steep ground angle, and may be taken off by tilting the rotor back, after a short run, whereupon the machine promptly assumes a steep climbing angle.

*Brief summary of specific advantages of several illustrated embodiments*

The first embodiment of the invention is characterized by the elimination of supplemental fixed wings, ailerons and elevators, whereby reduction in cost and weight of the machine is obtained, as well as a very substantial increase in efficiency and in top speed for a given power plant. Variation in dynamic stabilizing of the craft, particularly to obtain the best flying attitude of the body thereof in cruising flight, under variations in disposable load, is obtained by the use of a small, adjustable, horizontal stabilizer. This embodiment of the invention is also characterized by a very simple type of control, so far as normal flight operation is concerned; such normal operation requiring only the usual movements of the control stick and rudder pedals. The rotor head of this construction involves an advantageous vibration damping mechanism in association with the tilting pivots, as well as a yielding connection in the rotor control rods, and flexible interconnection between the vertical rods and the hub arms so that the rotor may be variably tilted in one plane, without disturbance or restraint by the control mechanism connected in the other plane. In addition, stops are provided to prevent excessive tilting in any direction, which not only determines clearances between the rotary wings and other parts of the craft, but may also be used to limit the angle of diving which the craft may be made to assume. This form of the invention also takes advantage of the fact that in take-off, the tail is normally in contact with the ground, by mounting a tail wheel in such manner that it is controllable with the rudder, which is a considerable advantage when it is necessary to take off cross-wind. The controls, and notably the rotor controls in this embodiment, have the advantage of being provided with adjustable friction devices which tend to maintain the various positions to which the controls may momentarily be moved, and also tend to reduce the transmission of vibrations to the pilot's controlling levers. This embodiment of the invention as well as the second form is also equipped with bias devices (certain advantages of which have already been mentioned) which are further made adjustable so as to effect automatic trimming of the machine at various different speeds, as desired.

As to the second embodiment of the invention, it may be generally noted that, although it is illustrated, for convenience, as applied to a single cockpit machine, it is in fact more particularly suitable for large multi-passenger aircraft, since it includes means of bodily shifting the longitudinal position of the rotor axis (and thus its center of lift) to meet large variations in the longitudinal position of the center of gravity. Thus also this form combines in a single set of controls, rotor control and aileron and elevator control for the craft, whereby an exceptionally powerful controlling action is obtainable in normal flight. The damping or friction devices for the individual blades of the rotor in this form of mechanism are of advantage not only for blade movement control but also as a means of minimizing vibrations imparted to the tilting and movable carriage controls of the rotor. It has also been found that longitudinal movement of the rotor mounting axis carriage can be accomplished, even in flight, with relatively little effort, especially since the location of the tilting pivots is normally such, with respect to the focal point of the rotor and the center of gravity of the craft, that little or no twisting strains are imposed upon the carriage and its guideways. The universal joint and slip joint in the starter shaft are given a considerable range of movement, so as to allow extreme freedom of tilting and displacement movements of the rotor hub and of the upper starter unit (comprising dog clutch, gears, etc.) which is mounted on the rotor head. In this construction, as well as in the first form, simplicity and lightness of weight are characteristic of the tilting pivot arrangement, in which the two tilting pivot axes are associated with a common block or pivot piece, which in turn has stop devices cooperating with the subjacent mounting mechanism. The sliding carriage adjustment for shifting the rotor axis is particularly advantageous in compensating for variable loading, since it includes an irreversible gear in the form of the worm and sprocket device employed.

As to the third embodiment of the invention, it is to be especially observed that the entire flight control of the craft is placed in the rotor, which cooperates with the location of the center of gravity and the disposition of the various body and fin areas of the craft to give ample control under all flight conditions; and in this connection it should be noted that in order to obtain ample effective body or fin area above the center of gravity, a streamlined rotor pylon is employed, which not only serves to enclose the rotor mounting and control structure but also is formed with a much higher aspect ratio than is possible at the vertical tail fin. This is of especial importance in obtaining full automatic banking when making turns at high forward speed, at which time there must be a preponderance of effective fin area above the center of gravity of the craft. To increase the directional stability, this form of the invention involves a novel arrangement of the vertical tail fin, which latter extends forwardly beneath the fuselage as well as above it. The interlock between the longitudinal rotor tilting control and the rotor starter and wheel brake operating devices is specially advantageous when starting up the rotor in windy weather, since, in starting the rotor, the rotor itself must be tilted forwardly and downwardly which minimizes the lifting effect thereof when headed into the wind ready for take-off; and further since the wheel brakes by this arrangement are normally kept applied while the rotor is being started. Other structural and operating advantages of these interlocks have been heretofore mentioned. In this arrangement there is also an advantage in that the rotor starter is automatically disengaged by movement of the rotor control for take-off and is prevented from re-engaging in flight, and further in the fact that universal and slip joints in the starter mechanism may even be dispensed with, since the upper end of the starter shaft, and its driving cone, do not move with the tilting of the rotor but are mounted on the fixed part of the axis structure. As to the rotor controls it will be observed that the lateral tilting control is effected through an irreversible gear, which minimizes or eliminates the unpleasant effects of vibration or wind gusts on the control element in the pilot's hands, and in addition there is a yielding resilient connection in the control which permits of some compensating movements of the rotor, with the control locked in a given position. The control mechanism of this form of the invention is especially easy to operate, since the pivot mechanism for the rotor blades intersects the rotational axis, thus bringing the focal points of the rotor down to said point of intersection and very close to the tilting pivot axes. The foot pedal device, as before discussed, makes possible the quick tilting back of the rotor for utilizing its braking effect or to zoom over obstacles, even though the normal rotor controls may at the moment be in their locked positions.

The arrangement of Figure 24, in which all pivots of the rotor head intersect, as well as intersect the rotational axis, is of course applicable to any one of the three machines, where an especially easy control is required. An example of the applicability of the arrangement of Figure 24 to one of the three primary embodiments appears in Figure 24a, wherein the hub of Figure 24 is illustrated in association with the rotor drive of the form of Figures 20 to 23.

I claim:

1. In an aircraft, a principal means of support in flight comprising a sustaining rotor of the autorotatable-wing type having a substantially vertical rotational axis hereinafter referred to as the rotor axis, means for controllably tilting said rotor axis in relation to the body of the aircraft in at least one generally vertical plane about at least one real or virtual pivot axis, characterized in that any such pivot axis is located above the center of gravity of the aircraft, that the point of intersection of the rotor axis with the projection of the line of resultant aerodynamic reaction of the rotor on a plane containing both the rotor axis and the shortest distance between the rotor axis and said pivot axis is above said pivot axis, and that the said pivot axis is offset from the rotor axis in the direction of the aerodynamic reaction line so that in no condition of forward flight does the rotor axis lie between the aerodynamic reaction line and the said pivot axis, the limiting case in which the said pivot axis passes through the said point of intersection being included.

2. An aircraft in accordance with the preceding claim, wherein the rotor comprises a hub member having a plurality of blades articulated thereto by pivot means including generally horizontal pivotal axes; the real or virtual pivot axis, about which the rotor axis is tiltable, being located in or closely adjacent a plane containing the said horizontal pivotal axes of the blade articulation means.

3. An aircraft in accordance with claim 1, in which the pivot axis is arranged for longitudinal tilting of the rotor and extends generally transversely of the craft.

4. An aircraft in accordance with claim 1, in which the pivot axis is arranged for lateral tilting of the rotor and extends generally longitudinally of the craft.

5. In an aircraft, a construction according to claim 1 having means for variably positioning the physical location of said pivot axis.

6. In an aircraft, a construction according to claim 1 having means for adjusting the location of said pivot axis horizontally of the craft to various positions.

7. In an aircraft, a construction according to claim 1 having mechanism for bodily shifting the rotational axis and its tiltable mounting horizontally of the craft.

8. In an aircraft, a rotative sustaining system including an upright axis structure, blade or wing means adapted to be aerodynamically rotated about said axis structure as a center and mounted for movement with respect to said structure about an axis substantially intersecting the axis of said structure, and control mechanism for the wing means providing for controllable shifting of the lift line of said system, the mounting for each wing including two individual articulations angled to each other and to the longitudinal axis of the wing, whereby to minimize control loads.

9. In an aircraft, an air-driven sustaining and controlling rotor comprising an axis member, a plurality of elongated aeroform wings pivotally mounted on said member in position to be normally autorotated by the relative flight-wind, pivot axis means for so mounting the wing means positioned transverse and intersecting the axis of said member, and tilting pivot means on which said axis member is mounted for control purposes, said tilting pivot means being transverse the axis of said member and intersecting the same at the plane of intersection of the wing mounting pivot means and the axis of said member.

10. In an aircraft, a sustaining and controlling rotor blade system comprising a rotatable aeroform blade normally positioned in flight at positive-lift incidence relative to its general rotational path, pivot mechanism for said blade system incorporating a plurality of pivot axes which provide for blade movements for control purposes as well as to compensate for differential flight forces and minimize gyroscopic effects, said mechanism providing an axis of blade oscillation transverse to the general axis of rotation and a rocking axis approximately intersecting said axis of oscillation, both of said axes substantially intersecting the general axis of rotation, and mechanism for controlling said rotor blade system comprising a pilot's control member mounted for movement in a plurality of planes and coupled with pivoted parts of said system by control connections adapted to effect blade movements which tilt the lift line of said system in like sense to the direction of movement of said member by the pilot.

11. In an aircraft, a sustaining and controlling rotor blade system comprising a rotatable aeroform blade normally positioned in flight at positive-lift incidence relative to its general rotational path, power drive means for said system adapted to provide also for autorotational operation of said system, pivot mechanism for said blade system incorporating a plurality of pivot axes which provide for blade movements for control purposes as well as to compensate for differential flight forces and minimize gyroscopic effects, said mechanism providing an axis of blade oscillation transverse to the general axis of rotation and a rocking axis approximately intersecting said axis of oscillation, both of said axes substantially intersecting the general axis of rotation, and mechanism for controlling said rotor blade system comprising a pilot's control member mounted for movement in a plurality of planes and coupled with pivoted parts of said system by control connections adapted to effect blade movements which tilt the lift line of said system in like sense to the direction of movement of said member by the pilot, said power drive means being constructed and arranged to permit free blade pivotal movements and operation of the control mechanism under all flight conditions.

12. A construction according to claim 10 incorporating means by which the system acts to stabilize the craft at a certain flight attitude for a given flight speed.

13. A construction according to claim 10 incorporating non-rebounding damping means exerting a restraint upon the controllable operations of said system.

14. A construction according to claim 10, together with resistive means acting to restore said blade to a given general path of rotation relative to the aircraft when their relationship is aerodynamically disturbed.

15. In an aircraft, a sustaining and controlling rotor comprising elongated rotatable blade means, a centrally open rotor hub member, a rotor supporting member projecting upwardly into the central opening of the hub member, pivot mechanisms for respectively mounting the blade means on the hub member and the hub member on the supporting member having pivotal axes intersecting each other and the axis of rotation of the rotor to provide both for rocking movement of the blade means for control purposes and for swinging movement of the blade means to accommodate differential flight forces, and manually regulable means for controlling rocking movement of the blade means, whereby to control the attitude of the aircraft laterally and longitudinally.

16. A construction according to claim 10, wherein the pivot mechanism comprises a mounting of said blade on a hub by a pivot axis intersecting the general axis of rotation and also a central universal mounting of the hub relative to the general axis of rotation.

17. In an aircraft, a sustaining and controlling rotor comprising a plurality of rotatable aeroform blades, said blades being pivotally mounted for independent oscillation about axes transverse to the common axis of rotation and for rocking of their common axis of rotation about axes also transverse thereto, all of said axes intersecting at a common point, and means for controlling said rocking movements.

18. In an aircraft, a sustaining rotor comprising a plurality of sustaining blades, pivotal means enabling the blades to rock independently with respect to the general axis of rotation and other pivotal means enabling the rotor as a whole to rock relatively to the aircraft body, the axes of both said pivotal means intersecting the general axis of rotation at a common point; and means for controlling the rocking of the rotor upon said second named pivotal means.

19. In a rotative winged aircraft, a rotor hub including a rotatable shell, power means to drive the rotatable shell, a plurality of rotor blades extending radially from and driven by the rotatable shell, means associated with the rotor blades and the rotatable shell to permit vertical articulation of the rotor blades with reference to and about the center of the rotatable shell, and manually operable means to tilt the rotatable shell about substantially perpendicular axes intersecting within the rotatable shell.

20. In an aircraft sustaining rotor, an upright rotatable hub, a plurality of rotor blades radiating therefrom, a tiltable mounting for the hub providing for rocking thereof about a point located substantially on the axis of rotation, means mounting the blades on the hub for oscillation about said point, and driving mechanism on the hub located peripherally thereof and below the horizontal plane containing said fulcrum point.

21. In an aircraft sustaining rotor, an upright rotatable hub, a plurality of rotor blades radiating therefrom, a tiltable mounting for the hub providing for rocking thereof about a point located substantially on the axis of rotation, means mounting the blades on the hub for oscillation about said point, driving mechanism on the hub located peripherally thereof and below the horizontal plane containing said fulcrum point, and control mechanism for tilting the rotor on its mounting extending upwardly within the confines of said driving mechanism.

22. In an aircraft sustaining rotor, an upright rotatable hub, a plurality of rotor blades radiating therefrom, a tiltable mounting for the hub providing for rocking thereof about a point located substantially on the axis of rotation, means mounting the blades on the hub for oscillation about said point, and anti-friction bearing means for the hub located internally thereof and above the horizontal plane of said fulcrum point.

23. In an aircraft, a primary system of aerodynamically rotatable wings, a common axis on which said wings are pivotally mounted, means for rotatably and rockingly mounting the axis structure on the craft, control means for rocking said structure and thus the rotor as a whole for control purposes, and non-rebounding damping means for constraining rocking movements.

24. A construction according to claim 23 wherein the control means and damping means together comprise a hand operated control member with frictionally-damped control connections operatively connecting the control member and the rotor axis structure and constructed to provide freedom for automatic self-setting of the rotor under the influence of aerodynamically-induced loads when the control member is released but providing mechanical advantage for the pilot.

25. A construction according to claim 24 wherein said connections are directly-acting lever connections, the combination being so constructed and arranged that the rotor with its damped control means, when left free, moves automatically in a direction to assume a substantially neutral condition of control at a given flight speed.

26. An aircraft comprising a body and a sustaining rotor, said rotor comprising wing means adapted to be rotated by relative air-flow in flight, and a rotative axis on which said wing means are pivoted, mechanism for controlling the flight of the craft comprising mechanism for controllably shifting the lift line of said rotor in all directions with relation to the center of gravity of the craft and including means automatically counteractive of disturbing forces, said body including small auxiliary non-rotative surfaces and having an aerodynamic stability, independently of the rotor, which is positive in yaw and at least neutral in pitch and roll.

27. An aircraft in accordance with the preceding claim, and in which there is a substantially horizontal non-rotative tail surface, the "volume" of which is substantially less than that which would be required for effectively stabilizing the whole aircraft in pitch if the rotor lift line were not controllably movable relative to the aircraft body.

28. An aircraft in accordance with claim 26 having means controllable in flight for varying the angular setting of at least one of said surfaces.

29. In an aircraft, a primary sustaining system of aerodynamically-rotatable wings, a common axis on which said wings are pivotally mounted, means for rotatably and rockingly mounting the axis structure on the craft, control means for rocking said structure and thus the rotor as a whole for control purposes, and means for minimizing the transmission of aerodynamically-induced vibrations from the rotor to the controls, said last mentioned means being constituted primarily by the location of the virtual axis of rocking of the rotor close to the pivotal mounting for the wings and closer than the physical axis of rotation to the average lift line of the rotor.

30. In an aircraft, a primary system of aerodynamically-rotatable wings, a common axis on which said wings are pivotally mounted, mechanism for rotatably and rockingly mounting the axis structure on the craft including means by which the rotor automatically moves under the influence of air disturbances in a direction to shed the effect thereof and returns to a stable intermediate position of rocking at a given flight speed, manually-operable control means for rocking said structure and thus the rotor as a whole for control purposes, and means for minimizing the transmission of aerodynamically-induced vibrations from the rotor to the controls.

31. An aircraft including a body, power mechanism for forward propulsion thereof, the drag of the body and axis of the propulsion thrust being both arranged to act approximately through the center of gravity of the craft, and air driven mechanism for the sustention and control of the craft, said mechanism comprising a system of rotative wings normally positioned in flight at positive-lift incidence (relative to a plane perpendicular to the rotational axis) within the autorotational range and having a common upright axis, and being centered generally vertically above the center of gravity of the craft, pivot mechanism for said wing system incorporating a plurality of pivot axes which provide for wing movements for control purposes as well as to compensate for differential flight forces and minimize gyroscopic effects, control mechanism connected with pivoted parts of said system and movable in a plurality of planes to controllably shift the lift line of said system by pivotal wing movements, and means by which the system acts to maintain the craft on a substantially even keel at a given speed of forward propulsion with the control system left free.

32. In an aircraft, a primary sustaining system of pivotally and rotatably mounted wings, said wings being adapted to be aerodynamically actuable by relative air-flow, means of propulsion for the craft, a carriage movable generally horizontally of the craft, an axis structure for said system including relatively fixed and rotatable members, and a pivotal mounting for said fixed member on said carriage, said pivotal mounting having an axis extending generally transverse the rotor axis and forward of the center of the rotor axis.

33. In an aircraft, a primary sustaining system of pivotally and rotatably mounted wings, said wings being adapted to be aerodynamically actuable by relative air-flow, means of propulsion for the craft, a carriage movable generally horizontally of the craft, an axis structure for said system including relatively fixed and rotatable members, and a pivotal mounting for said fixed member on said carriage, said pivotal mounting including a pivot axis generally transverse the rotor axis and extending generally fore and aft of the craft and lying laterally to one side of the center of the rotor axis, the wings of said rotor being arranged to be normally rotated in a direction such that their rotative movement is rearward on that side of the machine toward which said pivot mounting axis is located.

34. In an aircraft, a main sustaining system of rotative wings adapted to be actuated by relative air-flow in flight, a rotative axis on which said wings are pivoted, control mechanism associated with the rotor and normally operative for controlling the craft as to its attitude in a plurality of planes, means for holding said control mechanism in any of a plurality of positions as against displacement by normal flight forces, and means in addition to said normally operative control mechanism for quickly releasing or overriding the control holding means.

35. In an aircraft, a body, a sustaining rotor having pivotally mounted wings adapted to be autorotated by relative airflow, a hub structure constituting the center of rotation of said wings, a pivotal mounting for the hub structure providing for tilting the axis thereof longitudinally through a considerable range, mechanism including a resilient device tending to maintain the axis of the hub structure at a predetermined position in said range, said resilient device having a resistance greater than the effective force of normal external disturbances acting upon the rotor, and other mechanism for effecting a sudden tilting of said axis rearwardly at will against the resistance of said resilient device.

36. In an aircraft, a body having toward the rear thereof normally fixed vertical and horizontal tail surfaces for directional and longitudinal stability, a streamlined rotor mounting pylon above the body, an autorotatably actuable sustaining rotor connected to the body by said pylon and having flappingly pivoted wings, means acting upon the rotor for shifting the path of rotation of the wings so as to shift the rotor liftline both laterally and longitudinally for control purposes, said streamlined pylon housing the control connections to the rotor and being positioned as upright fin surfacing for coaction above the center of gravity with the controllable rotor in laterally stabilizing and controlling the craft.

37. In an aircraft, a body, an autorotationally actuable sustaining rotor comprising rotative wings pivotally mounted for balancing differential flight forces and for shifting the lift line of the rotor for controlling the craft, said rotor being mounted above the body with its rotational axis positioned slightly behind the center of gravity of the craft, control mechanism for moving said wings to shift the lift line of the rotor relative to the center of gravity of the craft for control purposes, and means limiting the range of forward or diving control to a smaller value than the range of rearward or elevating control, whereby the lift line is prevented from being moved to such a location with respect to the center of gravity that the craft might attain a dangerous attitude while at the same time securing the capability of aerodynamic braking by extreme rearward tilt of the lift line.

38. For an aircraft having a sustaining rotor arranged to provide for shifting of the lift line thereof with respect to the center of gravity of the craft, a pilot's control member connected with the rotor for controllably shifting the lift line to maneuver the craft in flight, a releasable latch device for holding the control member in a position in which the lift line of the rotor is substantially vertical when the craft is at rest on the ground, said latch including means associated with said member at least when engaged, in position for ready release by the pilot's hand, and means biasing the latch to inoperative position when disengaged whereby to prevent unintentional latching of the control member in flight.

39. An aircraft including as its primary means of sustention a system of rotatable sustaining blade or wing means actuable by relative air-flow, an axis mechanism for said system, means of flexible attachment of the wing means to said mechanism whereby to permit swinging movements thereof under the influence of flight forces, and a pivotal mounting for said mechanism horizontally offset from the axis of said mechanism.

40. An aircraft including as its primary means of sustention a pivotally and rotatively mounted sustaining wing or rotor system, in which construction, in different conditions of flight, if the resultant aerodynamic reaction of said system be projected on a longitudinal vertical plane generally parallel to the normal wind direction in forward flight, the projected reaction line passes approximately through a substantially fixed focal point which lies in a plane containing the rotor axis, and an axis or mounting mechanism for said rotor providing for tilting movements thereof generally about a point which is longitudinally offset from the rotor axis.

41. An aircraft including as its primary means of sustention a pivotally and rotatively mounted sustaining wing or rotor system, in which construction, in different conditions of flight, if the resultant aerodynamic reaction of said system be projected on a transverse vertical plane generally at right angles to the normal wind direction in forward flight, the projected reaction line passes approximately through a substantially fixed focal point which lies in a plane containing the rotor axis, and an axis or mounting mechanism for said rotor providing for tilting movements thereof generally about a point which is laterally offset from the rotor axis.

42. An aircraft including as its primary means of sustention, a system of rotatable blades or wings actuable by relative air-flow, an axis mechanism for said system, means of flexible attachment of the blades to the axis mechanism whereby to permit swinging movements thereof under the influence of flight forces, in which construction the resultant lift line of the system, if projected on a substantially vertical longitudinal plane through the craft, in different conditions of flight, passes approximately through a focal point which is substantially fixed with respect to the rotor axis, and pivot means for mounting said axis mechanism located generally vertically below and forward of said focal point, whereby the rotor system as a whole may be readily tilted to different angular positions.

43. In an aircraft, a body, means of forward propulsion, a sustaining rotor of aerodynamically-actuable wings above the body, an upright rotative hub structure on which said wings are pivotally mounted, the thrust line of the propulsion means intersecting a horizontal plane containing the longitudinal body axis substantially at a transverse line through the center of gravity of the craft, the axis of said hub being normally located slightly rearwardly of said center of gravity and slightly upwardly-and-rearwardly inclined with respect to said body axis, and means for controllably tilting the axis of said hub about a transverse pivot axis located forwardly of the hub axis.

44. In an aircraft, a body, a primary sustaining system of aerodynamically-rotatable wings, a common rotative axis structure for said wings, means pivotally mounting said wings on said axis structure, and a controllably-movable mounting for the axis structure including a rotor tilting pivot axis positioned transversely of the craft forwardly of the rotor axis and slightly rearwardly of a transverse vertical plane passing through the center of gravity of the craft as a whole.

45. A construction in accordance with the preceding claim, and in which a line extending between said tilting axis and said center of gravity makes an angle of approximately 6° with respect to said transverse vertical plane.

46. A mounting structure for an aircraft sustaining rotor, comprising, in combination with the rotor hub, a normally non-rotative support connected with the craft, a normally non-rotative support associated with said hub, and pivot mechanism pivotally interconnecting said two supports and having a plurality of pivot axes extending generally transverse the axis of the hub, there being two such mounting pivot axes located substantially at right angles to each other and intersecting one another, the axis of the hub being offset from the point of intersection of said intersecting axes.

47. An elevatorless and aileronless aircraft having an air-actuable sustaining rotor and means for tilting the axis thereof laterally and longitudinally for lateral and longitudinal control including rotor tilting pivot axis means horizontally offset from the axis of the rotor, said rotor including pivots connecting the wings to their common axis member whereby the rotor thrust vector shifts its position with respect to said axis under various flight conditions, the pivot axis means being offset from the rotor axis in the direction of travel of said vector.

48. In combination, an elevatorless and aileronless aircraft, a rudder for directional control, and an air actuable sustaining rotor, with means for tilting the axis thereof laterally and longitudinally for lateral and longitudinal control including rotor tilting pivot axes horizontally offset from the rotor axis.

49. An aircraft including as its primary means of sustention a system of rotatable sustaining blade or wing means actuable by relative airflow, an axis mechanism for said system, means of flexible attachment of the wing means to said mechanism to permit swinging movements thereof under the influence of flight forces whereby the rotor lift line shifts away from the axis with increase of speed of the craft, a pivotal mounting for said mechanism providing a tilting axis therefor horizontally offset from the axis of said mechanism in the direction of shift of the lift line, and a control system coupled up to said axis mechanism and including a threaded connection or the like for obtaining a mechanical advantage.

50. In an aircraft, a body having an occupant's compartment therein, a system of pivotally and rotatively arranged sustaining blade or wing means adapted to be actuable by relative airflow and including a double-pivoted articulation for each blade, mounting means for said system comprising rotor tilting pivot axes at least one of which is horizontally offset from the axis of said system providing for movements thereof generally fore and aft as well as transversely of the body of the craft, a manually operable control stick or member mounted in the occupant's compartment for generally fore and aft and transverse movements, and operating connections extended between said member and the mounting means for said system, whereby to effect fore and aft and transverse movements of the latter by generally corresponding movements of the former.

51. In an aircraft, a body, an autorotationally actuable sustaining rotor comprising a generally upright hub and rotative wings pivotally mounted thereon, characterized in that the lift line of the rotor diverges from the rotational axis of the hub to various degrees dependent upon the angle of attack of the rotor as a whole to the relative flight wind, and mechanism mounting the rotor hub on the body including a generally horizontal pivot providing for tilting of the hub, the axis of said pivot being horizontally offset from the hub axis in the direction of divergence of the lift line a distance at least as great as the maximum divergence.

52. In an aircraft, a body, an autorotationally actuable sustaining rotor comprising a generally upright hub and rotative wings pivotally mounted thereon, characterized in that the lift line of the rotor diverges from the rotational axis of the hub to various degrees dependent upon the angle of attack of the rotor as a whole to the relative flight wind, mechanism mounting the rotor hub on the body including a generally horizontal pivot providing for tilting of the hub, the axis of said pivot being horizontally offset from the hub axis in the direction of divergence of the lift line a distance at least as great as the maximum divergence whereby the rotor lift normally sets up a couple tending to tilt the hub about said tilting pivot, and means resisting said movement.

53. In an aircraft, a body, an autorotationally actuable sustaining rotor comprising a generally upright hub and rotative wings pivotally mounted thereon, characterized in that the lift line of the rotor diverges from the rotational axis of the hub to various degrees dependent upon the angle of attack of the rotor as a whole to the relative flight wind, mechanism mounting the rotor hub on the body including a generally horizontal pivot providing for tilting of the hub, the axis of said pivot being horizontally offset from the hub axis in the direction of divergence of the lift line a distance at least as great as the maximum divergence whereby the rotor lift normally sets up a couple tending to tilt the hub about said tilting pivot, and elastic means reacting between the body and the rotor in opposition to said couple.

54. In an aircraft, a body, an autorotationally actuable sustaining rotor comprising a generally upright hub and rotative wings pivotally mounted thereon, characterized in that the lift line of the rotor diverges from the rotational axis of the hub to various degrees dependent upon the angle of attack of the rotor as a whole to the relative flight wind, mechanism mounting the rotor hub on the body including a generally horizontal pivot providing for tilting of the hub, the axis of said pivot being horizontally offset from the hub axis in the direction of divergence of the lift-line a distance at least as great as the maximum divergence whereby the rotor lift normally sets up a couple tending to tilt the hub about said tilting pivot, elastic means reacting between the body and the rotor in opposition to said couple, and means for adjusting the reaction of said elastic means.

55. In an aircraft having a body and means of propulsion, a sustaining rotor thereabove comprising a hub structure with generally upright axis and a plurality of aeroform blades positioned for autorotational actuation by relative air flow and pivotally mounted thereon whereby upon increase of forward speed under the influence of the propulsion means the lift line of the rotor shifts with relation to the physical axis of the hub, a pivotal mounting for the hub providing for automatic movement of the axis relative to the center of gravity of the craft, said shifting lift line setting up a variable couple tending to move the hub on its mounting, and a yielding resistance device acting upon the hub in a direction opposed to said couple.

56. In an aircraft having a body and means of propulsion, a sustaining rotor thereabove comprising a hub structure with generally upright axis and a plurality of aeroform blades positioned for autorotational actuation by relative air flow and pivotally mounted thereon whereby upon increase of forward speed under the influence of the propulsion means the lift line of the rotor shifts with relation to the physical axis of the hub, a pivotal mounting for the hub providing for automatic movement of the axis relative to the center of gravity of the craft, said shifting lift line setting up a couple varying in magnitude and direction and acting to move the hub on its mounting, yielding resistance means acting upon the hub in opposition to said couple in either direction beyond a predetermined neutral position, and means for adjusting said yielding means for varying the position at which it exerts zero force.

57. In an aircraft, a main sustaining system of rotative wings adapted for actuation by relative air-flow in flight, a rotative axis on which said wings are pivoted, means for tilting said axis including a control member and a transmission device between the control member and the rotative axis, the transmission device incorporating a yielding element providing freedom for limited movement of said axis with respect to the control member.

58. In an aircraft, a main sustaining system of rotative wings adapted to be actuated by relative air-flow in flight, a rotative axis on which said wings are pivoted, means for tilting said axis including an irreversible transmission device, and yielding means between said axis and said device.

59. For an aircraft having an autorotatable sustaining wing system or rotor, a rotor mounting and adjusting apparatus comprising a fixed mounting structure, a movable rotor hub supporting member, a pivot device mounting said member on said structure, mechanism connected with said member and adjustable to various fixed positions for adjustably tilting the latter to various corresponding positions about said pivot device, and cushioning means providing for a slight overtravel of said member beyond the point determined by any given fixed setting of said mechanism.

60. In an aircraft, a main sustaining system of rotative wings positioned to be normally actuated by relative air-flow in flight, a rotative axis on which said wings are pivoted, means for tilting said axis for control purposes, an engine for forward propulsion, power transmission means for connecting said engine to the rotor to start the latter and including a controllable coupling, and means operatively associating the rotor tilting means and the controllable coupling, including mechanism so constructed and arranged that the coupling is normally automatically disengaged but comprising mechanism for engaging it when the rotor axis is tilted forwardly, i. e., in the direction of decreasing rotor incidence, to a position beyond the normal flying range.

61. In an aircraft in accordance with the preceding claim, a manually operable device for controlling longitudinal tilting of the rotor axis and means cooperating with said device for hindering the pilot from tilting the rotor axis in flight sufficiently forwardly to cause engagement of the coupling device.

62. In an aircraft having a body and an undercarriage with braking means, a set of movably mounted autorotatable sustaining wings, control means for the craft coupled with said autorotatable wings for moving them to shift the lift line thereof for control purposes, and mechanism coupling said control means with said undercarriage braking means for applying the braking means when the control means are in an extreme forward position and for releasing the braking means when in a position rearwardly thereof.

63. In an aircraft having a body, a propulsion engine and an undercarriage with braking means, a set of movably mounted autorotatable sustaining wings, a disconnectible driving device for actuating said wings from said engine, control means for the craft coupled with said autorotatable wings for moving them to shift the lift-line thereof for control purposes, and mechanism coupling said control means with said undercarriage braking means and with said disconnectible driving device and constructed to actuate said driving device and braking means when the control means are in an extreme forward position and for releasing them when in a position rearwardly thereof.

64. In an aircraft having a propulsion engine, a normally autorotatable sustaining rotor, means for moving said rotor for control purposes, a control device movable fore and aft coupled to said rotor for moving the same, a frictional driving element actuated by said engine, and a frictional driven element mounted on said rotor to move therewith and so positioned as to be drivingly engaged with said frictional driving element upon extreme forward movement of said control device.

65. In an aircraft having a body, a set of movably mounted autorotatable sustaining wings, a power plant in said body, starter mechanism for initiating rotation of said wings from said power plant, control means for the craft coupled with said autorotatable wings for moving them to shift the lift line thereof for control purposes, and means for putting said starting mechanism in operative condition under the influence of a movement of the control means to an extreme forward position and for rendering said starting mechanism inoperative upon movement of the control means rearwardly from said position.

66. In an aircraft having power-driven means of propulsion adapted to effect a wide range of flight speeds, a plurality of flappingly-movable autorotatable wings for sustention, a control system comprising movably mounted control surfaces secured to the craft in position to be of maximum effectiveness in high speed forward flight, a control system comprising said rotative wings and a shiftably mounted axis therefor arranged for movements of the sustention thrust line with respect to the center of gravity of the craft and positioned to be fully effective for control purposes at minimum forward flight speed, and common control means connected to both of said systems for operating them in conjunction over the entire range of flight speeds, whereby maximum maneuverability is maintained under all flight conditions.

67. In an aircraft having power-driven means of propulsion adapted to effect a wide range of flight speeds, a plurality of autorotatable wings providing most of the lift at minimum flight speed and mounted by pivot means providing for flapping movements of the said wings, fixed surfaces positioned to assure a progressively increasing burden of the lift with increase in forward flight speed, a control system comprising movably mounted control surfaces secured to said fixed surfaces in position to be of maximum effectiveness in high speed forward flight, a control system comprising said rotative wings and a shiftably mounted axis therefor arranged for movements of the rotor sustention thrust line with respect to the center of gravity of the craft and positioned to be fully effective for control purposes at minimum forward flight speed, and common control means connected to both of said systems for operating them in conjunction over the entire range of flight speeds, whereby maximum efficiency and maneuverability are maintained under all flight conditions.

68. In an aircraft having power-driven means of propulsion adapted to effect a wide range of flight speeds, a main sustaining system of pivoted autorotatable wings mounted on a hub which is freely rotated by said wings in flight, a supplemental system of fixed wings, and fixedly pivoted control surfaces, said rotary wing system taking the major burden of the lift during vertical descent, said fixed wing system taking a progressively increasing proportion of the total lift with increase in forward speed, and control mechanism connected to pivoted parts of the rotor and to said pivoted control surfaces for conjoint operation of the rotary wings and said surfaces in controlling the craft throughout the range of flight speeds.

69. In an aircraft having a power-driven propulsive air screw adapted to effect a wide range of flight speeds, a sustaining system comprising a hub and autorotatable wings pivoted thereon and positioned to take the major burden of the lift during vertical descent of the craft, a sustaining system of fixed wings positioned to take a progressively increasing burden of the lift with increase in forward speed, a control system operative to actuate the pivoted autorotatable wings to shift the position of the lift line thereof both laterally and longitudinally, an elevator pivotally mounted on said aircraft within the slipstream of said air screw, ailerons pivotally mounted on said fixed wings, a control system operative to actuate said elevator and ailerons, and a common manually controllable member connected to both of said control systems for conjointly operating the elevator with longitudinal shift of said lift line and said ailerons with lateral shift of said lift line throughout the entire range of flight speeds, whereby substantial efficiency, control and maneuverability are secured under all flight conditions.

70. In an aircraft having power-driven means of propulsion adapted to effect a wide range of flight speeds, a plurality of oscillatably-movable autorotatable wings for sustension, a control system comprising movably mounted control surfaces secured to the craft in position to be of maximum effectiveness in high speed forward flight, a control system comprising said rotative wings and means arranged for effective shifting movements of the sustention thrust line with respect to the center of gravity of the craft and positioned to be fully effective for control purposes at minimum forward flight speed, and common control means connected to both of said systems for operating them in conjunction over the entire range of flight speeds, whereby maximum maneuverability is maintained under all flight conditions.

71. In an aircraft having power-driven means of propulsion adapted to effect a wide range of flight speeds, a plurality of autorotatable wings providing most of the lift at minimum flight speed and mounted by pivot means providing for oscillatable movements of the said wings, fixed surfaces positioned to assume a progressively increasing burden of the lift with increase in forward flight speed, a control system comprising movably mounted control surfaces secured to said fixed surfaces in position to be of maximum effectiveness in high speed forward flight, a control system comprising said rotative wings and means arranged for effective shifting movements of the rotor sustention thrust line with respect to the center of gravity of the craft and positioned to be fully effective for control purposes at minimum forward flight speed, and common control means connected to both of said systems for operating them in conjunction over the entire range of flight speeds, whereby maximum efficiency and maneuverability are maintained under all flight conditions.

JUAN DE LA CIERVA.

CERTIFICATE OF CORRECTION.

Patent No. 2,380,580.  July 31, 1945.

JUAN de la CIERVA.

It is hereby certified that error appears in the above numbered patent requiring correction as follows: In the drawings, Figure 24a as shown below should be added as a part of the patent -

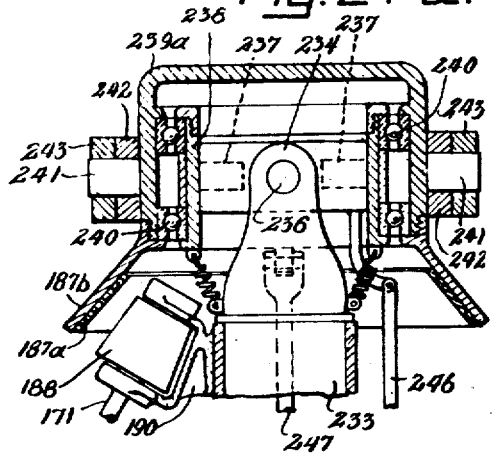

page 4, first column, line 9, for the word "Figures", read --Figure--; line 42, strike out "the" before "incidence"; and second column, line 32, for "2a—a" read --2a—2a--; page 5, second column, line 51, for "means or" read --means for--; and that the said Letters Patent should be read with this correction therein that the same may conform to the record of the case in the Patent Office.

Signed and sealed this 13th day of November, A. D. 1945.

Leslie Frazer (Seal)  First Assistant Commissioner of Patents.